(12) United States Patent
Ben-Tzvi

(10) Patent No.: US 8,225,892 B2
(45) Date of Patent: Jul. 24, 2012

(54) HYBRID MOBILE ROBOT

(75) Inventor: Pinhas Ben-Tzvi, Kensington, MD (US)

(73) Assignee: Pinhas Ben-Tzvi, Kensington, MD (US)

( * ) Notice: Subject to any disclaimer, the term of this patent is extended or adjusted under 35 U.S.C. 154(b) by 50 days.

(21) Appl. No.: 12/927,832

(22) Filed: Nov. 26, 2010

(65) Prior Publication Data

US 2011/0073387 A1 Mar. 31, 2011

Related U.S. Application Data

(62) Division of application No. 11/980,782, filed on Oct. 31, 2007, now Pat. No. 7,874,386.

(51) Int. Cl.
*B62D 55/00* (2006.01)
*B62D 55/075* (2006.01)

(52) U.S. Cl. ........ 180/9.1; 180/9.32; 180/9.4; 180/9.62; 180/65.8; 280/5.24; 280/5.22; 280/5.3; 280/5.32; 901/1; 901/47

(58) Field of Classification Search ........................ None
See application file for complete search history.

(56) References Cited

U.S. PATENT DOCUMENTS

| | | | |
|---|---|---|---|
| 4,483,407 A | 11/1984 | Iwamoto et al. | |
| 4,621,562 A | 11/1986 | Carr et al. | |
| 4,932,831 A | 6/1990 | White et al. | |
| 5,022,812 A | 6/1991 | Coughlan et al. | |
| 6,113,343 A | 9/2000 | Goldenberg et al. | |
| 6,263,989 B1 | 7/2001 | Won | |
| 6,431,296 B1 | 8/2002 | Won | |
| 6,668,951 B2 | 12/2003 | Won | |
| 2007/0209844 A1* | 9/2007 | Kamimura | 180/9.32 |

OTHER PUBLICATIONS

Murphy, R.R., Sep. 2004, "Activities of the Rescue Robots at the World Trade Center from Sep. 11-21, 2001", IEEE Robotics and Automation Magazine, 11(3), pp. 50-61.
Carlson, J., and Murphy, R.R., Jun. 2005, "How UGVs Physically Fail in the Field", IEEE Transactions on Robotics, 21(3), pp. 423-437.
Munkeby, S., Jones, D., Bugg, G., Smith, K., Jul. 2002, "Applications for the MATILDA Robotic Platform", *Proceedings of SPIE—Unmanned Ground Vehicle Technology IV*, 4715, pp. 206-213.
Frost, T., Norman, C., Pratt, S., and Yamauchi, B., Aug. 2002, "Derived Performance Metrics and Measurements Compared to Field Experience for the PackBot", *In Proceedings of the 2002 PerMIS Workshop*, Gaithersburg, MD, USA.
Blackburn, M.R., Bailey, R., and Lytle, B., Apr. 13-15, 2004, "Improved Mobility in a Multidegree-of-Freedom Unmanned Ground Vehicle (UGV)", *SPIE Proc.—UGV Technology VI*, Orlando, FL, 5422.

(Continued)

*Primary Examiner* — Joanne Silbermann
*Assistant Examiner* — Marlon Arce

(57) ABSTRACT

A hybrid mobile robot includes a base link and a second link. The base link has a drive system and is adapted to function as a traction device and a turret. The second link is attached to the base link at a first joint. The second link has a drive system and is adapted to function as a traction device and to be deployed for manipulation. In another embodiment an invertible robot includes at least one base link and a second link. In another embodiment a mobile robot includes a chassis and a track drive pulley system including a tension and suspension mechanism. In another embodiment a mobile robot includes a wireless communication system.

12 Claims, 23 Drawing Sheets

OTHER PUBLICATIONS

Michaud, F., Létourneau, D., Paré, J.F., Legault, M.A., Cadrin, R., Arsenault, M., et al, 2005, "Multi-modal locomotion robotic platform using leg-track-wheel articulations", Autonomous Robots, Special Issue on Unconventional Robotic Mobility, 18(2), pp. 137-156.

Hirose, S., Fukushima, E.F., Damoto, R., and Nakamoto, H., 2001, "Design of terrain adaptive versatile crawler vehicle HELIOS-VI", *Proc. IEEE/RSJ Int.Conf. on Intelligent Robots and Systems*, Hawaii, 3, pp. 1540-1545.

Taro Iwamoto and Hiroshi Yamamoto, "Mechanical design of variable configuration tracked vehicle", Transactions of the ASME—Journal of Mechanical Design, vol. 112, pp. 289-294, 1990.

\* cited by examiner

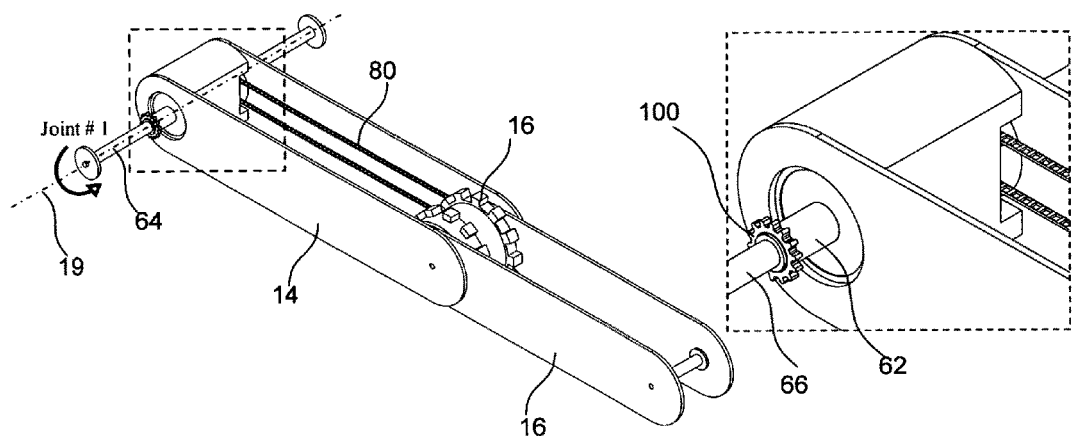
FIG. 16    FIG. 17
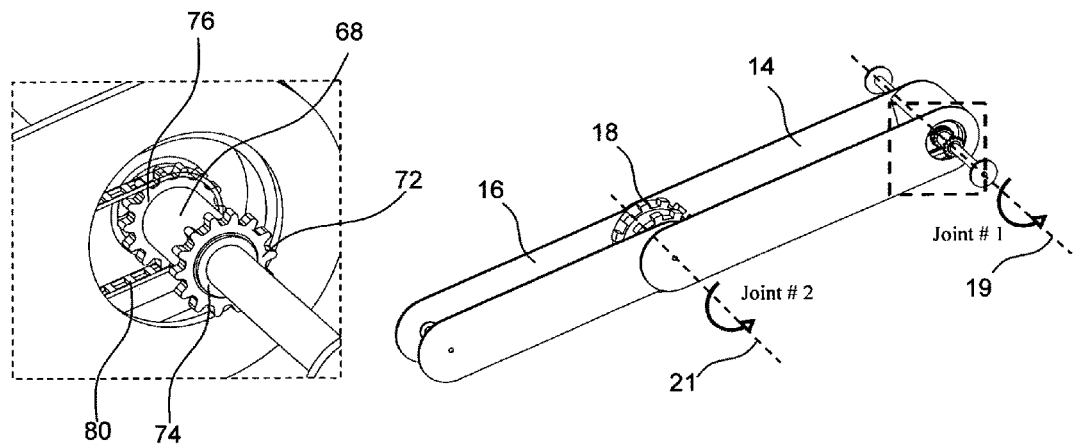
FIG. 19    FIG. 18

HYBRID MOBILE ROBOT

CROSS REFERENCE TO RELATED PATENT APPLICATION

This patent application is a divisional application to U.S. patent application Ser. No. 11/980,782 filed on Oct. 31, 2007 titled HYBRID MOBILE ROBOT which is incorporated herein by reference in its entirety.

FIELD OF THE INVENTION

This invention relates to mobile robots and in particular mobile robots that can be inverted and mobile robots that have an interchangeable configuration between locomotion and manipulation.

BACKGROUND OF THE INVENTION

In the aftermath of Sep. 11, 2001, mobile robots have been used for USAR (Urban Search and Rescue) activities such as searching for victims, searching paths through the rubble that would be quicker than to excavate, structural inspection and detection of hazardous materials. Among the few mobile robots that were used such as the Inuktun's Micro-Tracs™ and VGTV™ and Foster-Miller's Solem™ and Talon™, the capability was very limited in terms of locomotion and mobility. The capabilities are further limited if one considers any requirements of manipulation with an arm mounted on the mobile robot, and because of these limitations in many instances the robotic arm was not used at all. Some of the most serious problems with the robots were the robot flipping over or getting blocked by rubbles into a position from where it could not be righted or moved at all. None of the robots used on the rubble pile searches were successfully inverted after flipping over. These are only some of the several outstanding problems among the many challenges that are still encountered in the field of small Mobile Robots for Unmanned Ground Vehicle (UGV) operations for rough terrain applications.

Increasingly, mobile robotic platforms are being proposed for use in rough terrain and high-risk missions for law enforcement and military applications (e.g., Iraq for IEDs— Improvised Explosive Devices), hazardous site clean-ups, and planetary explorations (e.g., Mars Rover). These missions require mobile robots to perform difficult locomotion and dexterous manipulation tasks. During the execution of such operations loss of wheel traction, leading to entrapment, and loss of stability, leading to flip-over, may occur. These events often result in total mission failure.

Various robot designs with actively controlled traction, sometimes called "articulated tracks", were found to somewhat improve rough-terrain mobility, but with limited capability to reposition the mobile robot center of gravity (COG). The repositioning of COG allows a certain degree of control over the robot stability. Efforts are continuously made in designing robots that allow a wider control over COG location providing greater stability over rough terrains. This is achieved by designing robots with displacing mechanisms and actively articulated suspensions that allow for wider repositioning of the COG in real-time. However, the implementations of such solutions most often result in complex and cumbersome designs that significantly reduce robot's operational reliability, and also increase its cost.

There are numerous designs of mobile robots such as Pack-Bot™, Remotec-Andros™ robots, Wheelbarrow MK8™, AZIMUT™, LMA™, Matilda™, MURV-100™, Helios-II™, Variable configuration VCTV™, Ratler™, MR-1™, MR-5™ and MR-7™, NUGV™, and Talon™ by Foster Miller. They are mainly based on wheel mechanisms, track mechanisms and the combination of both. As well, some legged robots have been suggested for rough terrain use. However, all of these robots have certain limitations. Specifically they have difficulty getting out of certain situations such as if they become inverted.

A review of several leading existing mobile robot designs has indicated that it would be advantageous to provide a mobile robot wherein each kinematic link has multiple functions. Further it would be advantageous to provide a mobile robot that is invertible. Similarly it would be advantageous to provide an invertible mobile robot with an arm integrated into the platform. Still further, it would be advantageous to provide a mobile robot that has a tension and suspension system. One aim is to increase the robot's functionality while significantly reducing its complexity and hence drastically reducing its cost.

SUMMARY OF THE INVENTION

A hybrid mobile robot includes a base link and a second link. The base link has a drive system and is adapted to function as a traction device and a turret. The second link is attached to the base link at a first joint. The second link has a drive system and is adapted to function as a traction device and to be deployed for manipulation.

In another aspect of the present invention an invertible mobile robot includes at least one base link and a second link. Each base link has a drive system and the base links define an upper and a lower plane. The second link is attached to at least one base link. The second link has a drive system. The second link has a stowed position and an upper and lower plane and in the stowed position the second link upper and lower plane is within the upper and lower plane of the at least one base link.

In a further aspect of the invention a mobile robot includes a chassis and a pair of track drive pulley systems, one on each side of the chassis. Each track drive pulley system has a front and back pulley, a track, and a plurality of top and bottom spaced apart planetary supporting pulleys. Each pulley has a tension and suspension mechanism.

In a further aspect of the invention a mobile robot includes a base, a second link, an end link and a central control system. The base has a base drive system. The second link is attached to the base link at a first joint and the second link has a second link drive system. The end link is attached to the second link at a second joint and the end link has an end link drive system. The central control system is operably connected to the base drive system, operably connected to the second link drive system and operably connected via wireless communication to the end link.

Further features of the invention will be described or will become apparent in the course of the following detailed description.

BRIEF DESCRIPTION OF THE DRAWINGS

The invention will now be described by way of example only, with reference to the accompanying drawings, in which:

FIG. 16 is a left perspective view of the assembly and drive mechanism of the second and third link of the hybrid mobile robot of the present invention;

FIG. 17 is an enlarged left perspective view of the drive mechanism shown in FIG. 16;

FIG. 18 is a right perspective external view of the assembly and drive mechanism of the second and third link of the hybrid mobile robot of the present invention;

FIG. 19 is an enlarged right perspective view of the first joint of the drive mechanism shown in FIG. 18;

FIG. 32(c) shows a configuration where the second and third links are deployed towards the base link tracks; and FIG. 32(e) shows a configuration where the third link is deployed for manipulation purpose and the second link remains nested between the base links.

DETAILED DESCRIPTION OF THE INVENTION

The present invention introduces a new paradigm of mobile robot design for locomotion and manipulation purposes that was realized based on identifying and quantifying the existing gap between the traditional structures of typical mobile robots and their range of applications. Typically, a mobile robot's structure consist of a mobile platform that is propelled with the aid of a pair of tracks, wheels or legs, and a manipulator arm attached on top of the mobile platform to provide the required manipulation capability. However, the presence of an arm limits the mobility. On the other hand, there are several designs of mobile robots with the ability to return itself when flipped-over, but this is not possible if the robot is equipped with a manipulator arm. This gap is bridged in the approach herein by providing a new paradigm of mobile robot design that provides locomotion and manipulation capabilities simultaneously and interchangeably. The approach is also a new way of robot-surroundings interaction as it increases the mobile robot's functionality while reducing its complexity, and hence reducing its cost and increasing its reliability.

The new design paradigm is based on hybridization of the mobile platform and the manipulator arm as one entity for robot locomotion as well as manipulation. The new paradigm is that the platform and the manipulator are interchangeable in their roles in the sense that both can support locomotion and manipulation in several configuration modes. Such a robot can adapt very well to various ground conditions to achieve greater performance as a prospective product for a variety of missions for military, police and planetary exploration applications.

Description of the Design Paradigm

Figure 1:
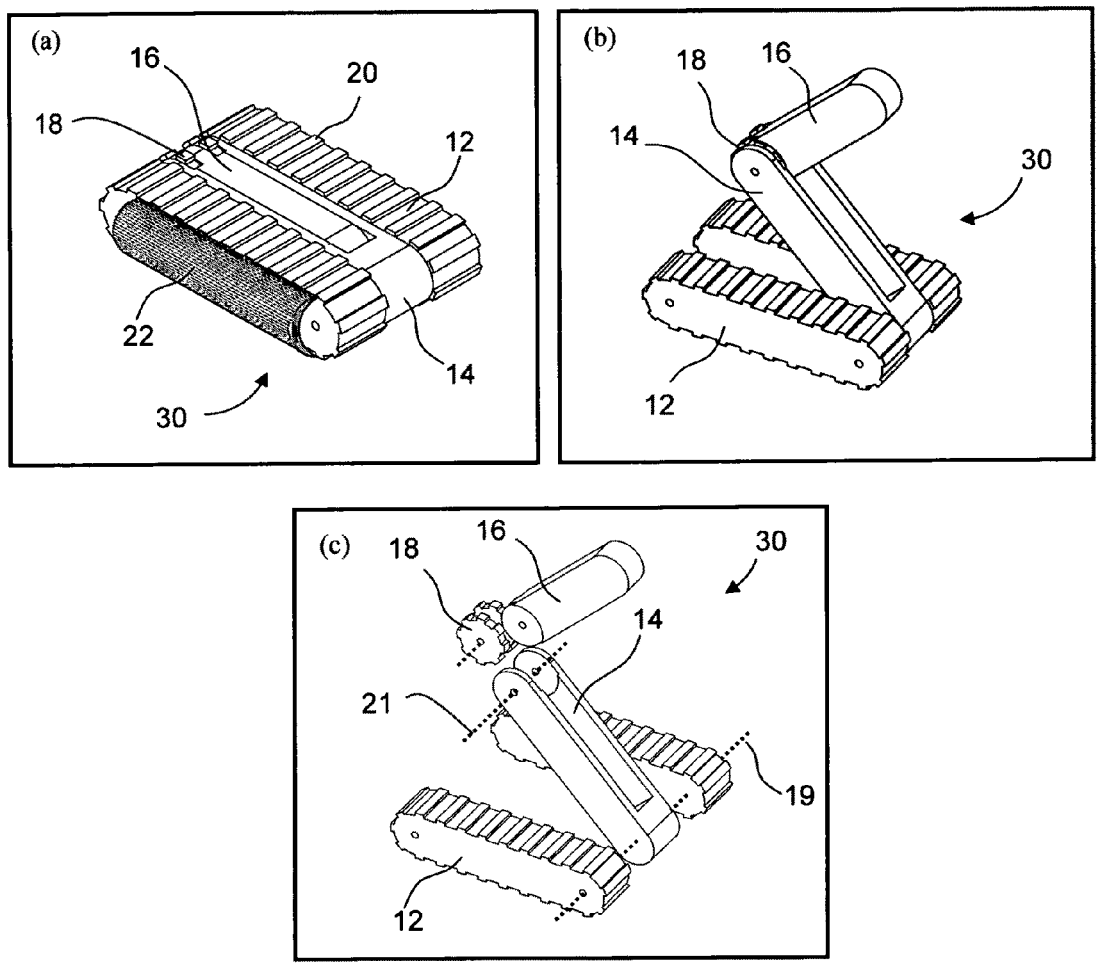
FIG. 1 shows three perspective schematic views of the hybrid mobile robot of the present invention wherein a) shows the closed or stowed position; b) shows an open configuration; and c) shows an exploded view in an open configuration.

FIG. 1 of the drawings depicts the mobile robot 30 of the present invention. If the platform is inverted due to flip-over, the symmetric nature of the design (FIG. 1(a)) allows the platform to continue to the destination from its new position with no need of self-righting. Also it is able to deploy/stow the manipulator arm from either side. Preferably rounded and pliable side covers 22 are utilized to prevent immobilization when the robot 30 flips over on either side as shown in FIG. 1(a).

The robot 30 includes two base links 12, link 14, link 16 and two wheel tracks 18. Link 14 is connected between the two base links 12 via a first joint 19 (FIGS. 1(b) and (c)). The two base links 12 have tracks 20 attached thereto. Two wheel tracks 18 are inserted between links 14 and 16 and connected via a second joint 21 (FIGS. 1(b) and (c)). The wheel tracks 18 are used to support links 14 and 16 when used as part of the platform while touching the ground. The wheel tracks 18 may be used passively or actively for added mobility. Both links 14 and 16 are revolute joints and are able to provide continuous 360 degree rotation. The robot's structure allows it to be scalable and can be customized according to various application needs.

Modes of Operation

The links 12, 14, 16 can be used in three modes:
1) All links used for locomotion to provide desired levels of maneuverability and traction;
2) All links used for manipulation to provide added level of manipulability. The pair of base links 12 can provide motion equivalent to a turret joint of the manipulator arm;
3) Combination of modes 1 and 2. While some links are used for locomotion, the rest could be used for manipulation at the same time, thus the hybrid nature of the design paradigm.

Figure 2:
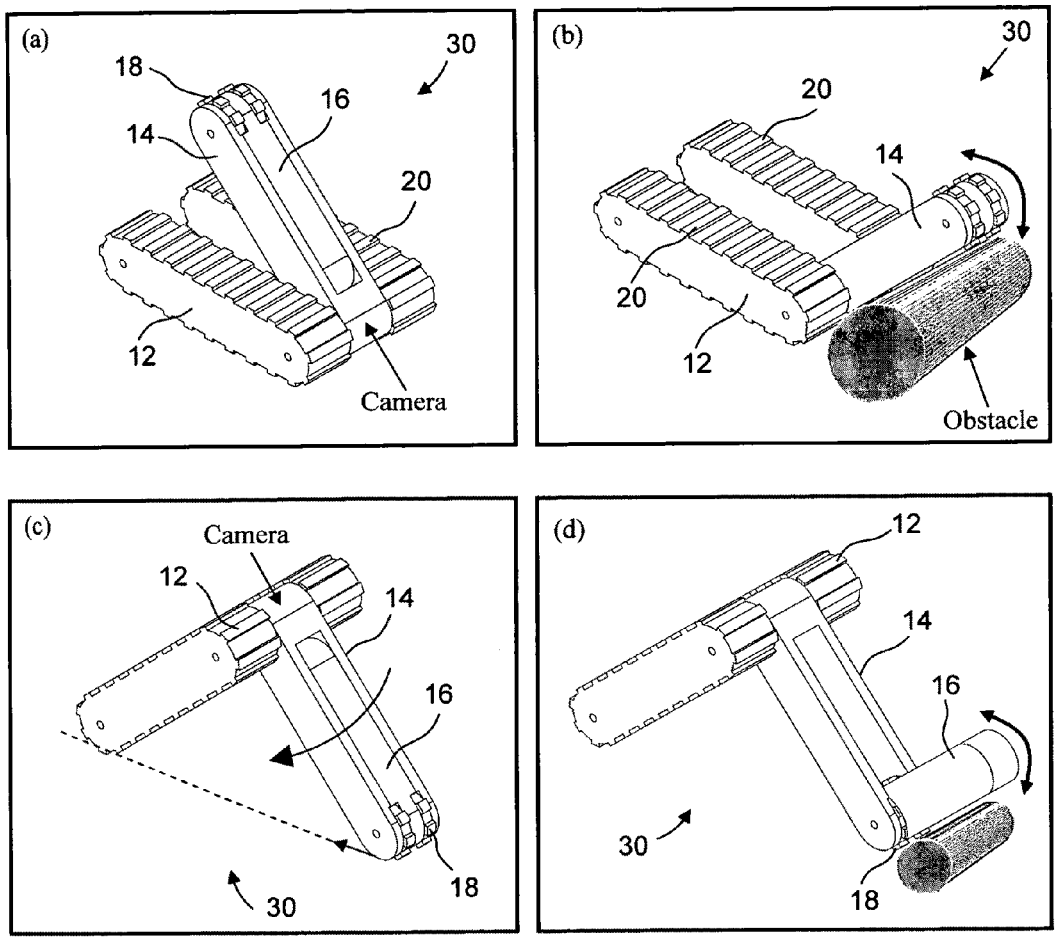
FIG. 2 shows four perspective schematic views of the hybrid mobile robot of the present invention showing the hybrid mobile robot configured for mobility purposes wherein a) shows a partially open configuration and showing the location of a camera; b) shows a second link configured to overcome an obstacle; c) shows the second link configured so that the camera can view another location; and d) shows the second and third links configured to overcome an obstacle.
Figure 3:
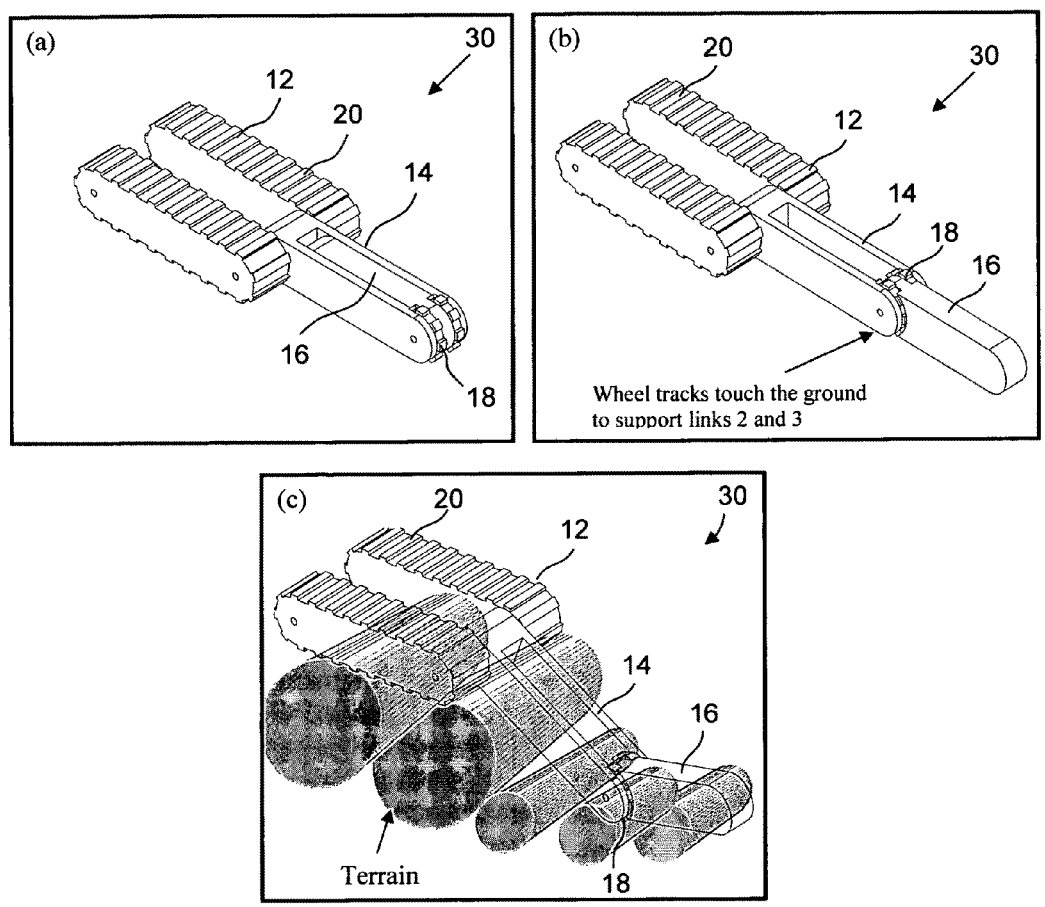
FIG. 3 shows three perspective schematic views of the hybrid mobile robot of the present invention configured for enhanced traction wherein a) shows the second link configured to be engaged with the ground; b) shows the second and third links configured to be engaged with the ground; and c) shows the second and third links configured to move over irregular terrain.
Figure 4:
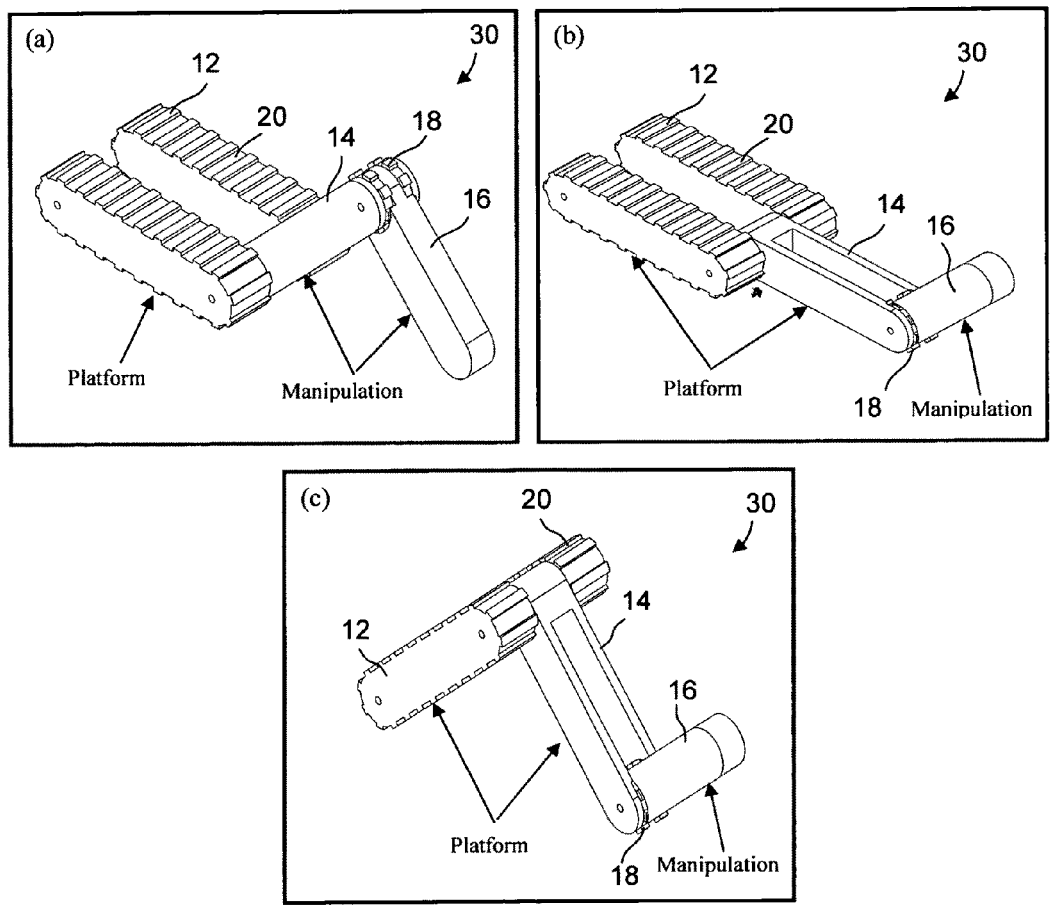
FIG. 4 shows three perspective schematic views of the hybrid mobile robot of the present invention configured for manipulation wherein a) shows the second and third links configured for manipulation; b) shows the second link configured as a platform and the third link for manipulation; and c) shows the second link configured as a platform on irregular terrain and the third link for manipulation.

All three modes of operation are illustrated in FIGS. 2, 3 and 4. In the proposed design the motors 24 and 88 (best seen in FIG. 8) used to drive the platform are also used for the manipulator arm as the platform itself is the manipulator arm and vice versa. In other words, the platform can be used for mobility while at the same time it can be used as a manipulator arm to perform various tasks.

Manoeuverability

FIG. 2 shows the use of link 14 to support the platform for enhanced mobility purposes. Link 14 can also be used for climbing purposes. Link 14 helps to prevent the robot 30 from being immobilized due to high-centering, enables the robot 30 to climb taller objects (FIG. 2(b)), and can help propel the robot 30 forward through continuous rotation. Link 14 is also used to support the entire platform while moving in a tripod configuration (FIG. 2(c)). This can be achieved by maintaining a fixed angle (90.degree. for instance) between link 14 and the base link 12 while the tracks 20 (shown more clearly in FIG. 10) are propelling the entire platform. Configurations (a) and (c) in FIG. 2 show two different possible configurations for camera use. Configuration (d) in FIG. 2 shows a case where link 16 is used to surmount an object while link 14 is used to support the entire platform in a tripod structure.

The posture of the tripod configuration as shown in FIG. 2(c) can be switched by placing link 14 behind the base links 12 instead of in front of them. This can be achieved by rotating link 14 in a clockwise direction (180.degree. for instance) while passing it between the base links 12. This functionality is effective when it is necessary to rapidly change the robot's 30 direction of motion in a tripod configuration.

Traction

For enhanced traction, link 14, and if necessary link 16 can be lowered to the ground level as shown in FIGS. 3(a) and 3(b). At the same time, as shown in configuration (c), the articulated nature of the mobile platform allows it to be adaptable to different terrain shapes and ground conditions.

Manipulation

FIG. 4 depicts different configurations of the platform for manipulation purposes. It can be seen that while some links are used as the locomotion platform others are used simultaneously for manipulation. Configuration (c) is similar to configuration (b) in FIG. 4 in terms of manipulation capabilities; however, configuration (b) is optimal for enhanced traction since the contact area between the locomotion platform and the ground is maximized. Configuration (c) is useful for increased maneuverability since the contact area between the locomotion platform and the ground is minimized.

Figure 32:
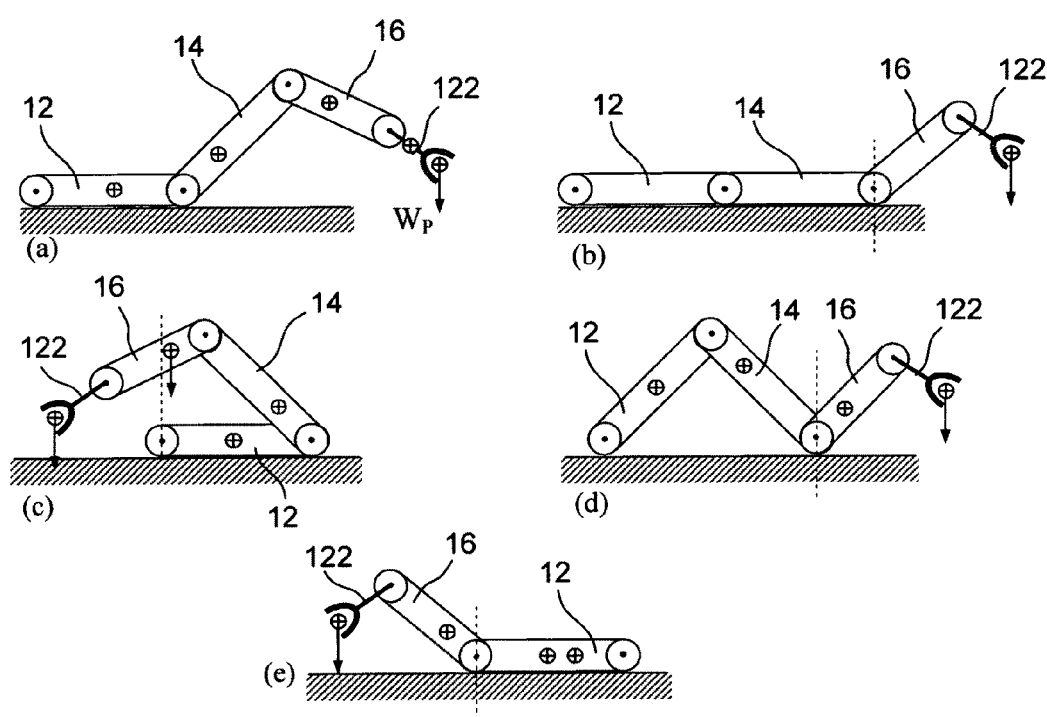
FIG. 32 shows five schematic views of the hybrid mobile robot of the present invention showing alternative configurations for manipulation wherein (a), (b) and (d) are similar to the configurations shown in FIGS. 4(a), (b) and (c), respectively.

Referring to FIG. 32, five configurations for manipulation are shown wherein FIGS. 32(a), (b) and (d) are similar to those shown in FIGS. 4(a), (b) and (c). Two other alternative configurations are shown in FIGS. 32(c) and (e). In FIG. 32(c), the second link 14 and third or end link 16 are deployed towards the base link tracks in the opposite direction such that the robot's structure allows for greater tip-over stability in order to carry heavier loads at the end-effecter. In this configuration, the COG of link 16 is closer to the COG of links 12 in order to provide much greater tip-over stability. FIG. 32(e) shows a configuration where the third link 16 is deployed for manipulation purpose, while the second link 14 remains folded between the base links 12 to allow manipulation with enhanced (yet less) tip-over stability but in more confined spaces without the second link 14 deployed to support the entire platform.

Mechanical Design Paradigm Architecture

Figure 5:
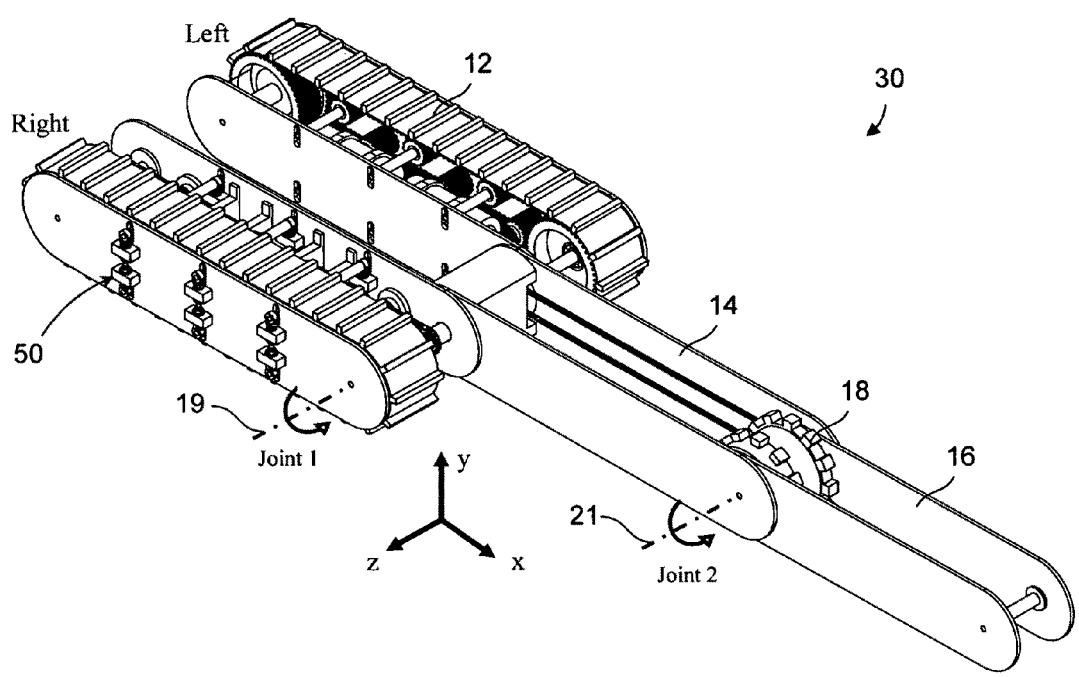
FIG. 5 is a perspective view of the hybrid mobile robot of the present invention showing a flat or open configuration.

The mechanical architecture of the mobile robot shown in FIG. 5 depicts the embodiment of the conceptual design paradigm. It includes a pair of base links 12 (left and right), a second link 14, a third or end link 16, and two wheel tracks 18. Link 14 is connected between the left and right base link 12 via the first joint 19. Two wheel tracks 18 are inserted between links 14 and 16 and connected via the second joint 21. The design also includes a built-in dual-operation track tension and suspension mechanism 50 situated in each of the base link 12 and is described below. This section describes in detail the platform drive system, arm joint design and integration of the arm into the platform. It will be appreciated by those skilled in the art that wheel tracks 18 are an example of a means of traction and that other traction means could be used.

Along with the challenge and effort to realize the concept into a feasible, simple and robust design, most of the components considered in this design are off-the-shelf. The assembly views show the platform/chassis design and the different internal driving mechanisms along with description of the components used and their function.

Figure 6:
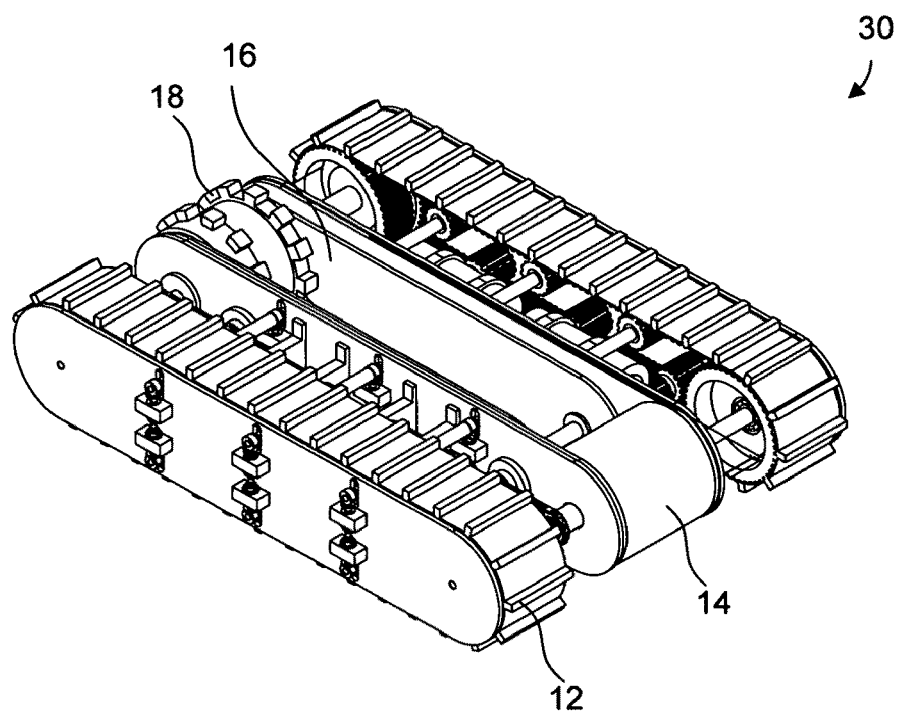
FIG. 6 is a perspective view of the hybrid mobile robot of the present invention in the stowed or closed position.
Figure 7:
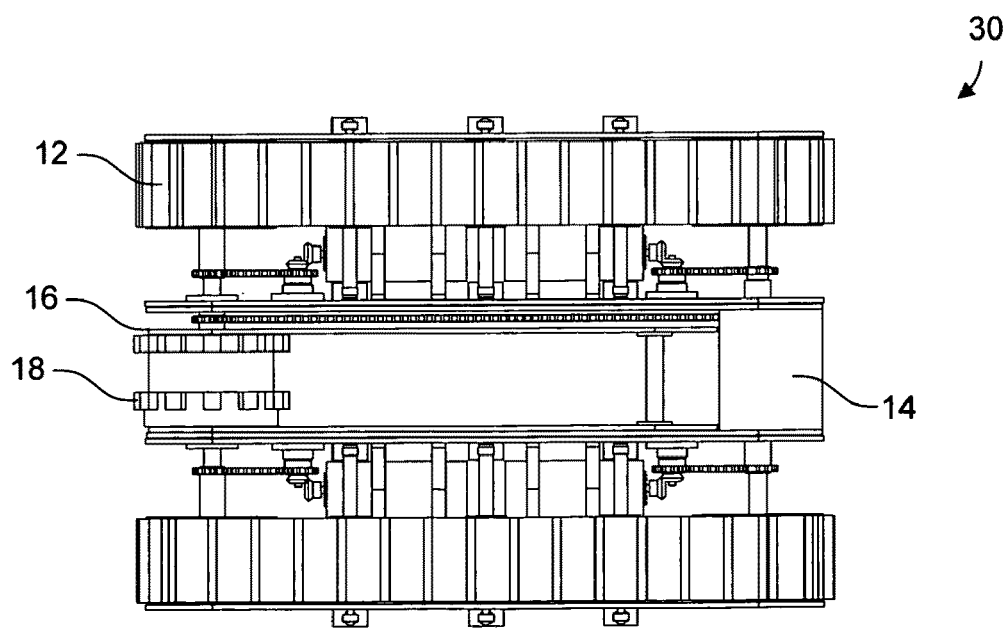
FIG. 7 is a top view of the robot of the present invention in the stowed position.

The closed configuration of the robot (FIGS. 6 and 7—all links stowed) is symmetric in all directions x, y and z. Although the design is fully symmetric, for the purpose of explanation only, the location of first joint 19 will be taken as the reference point, and it will be called the front of the robot. In the stowed or closed configuration link 16 is nested in link 14 such that no part of link 16 is above or below link 14. Similarly in the stowed or closed configuration link 14 is nested between base links 12 wherein no part of link 14 is above or below base link 12.

Motors

Figure 8:
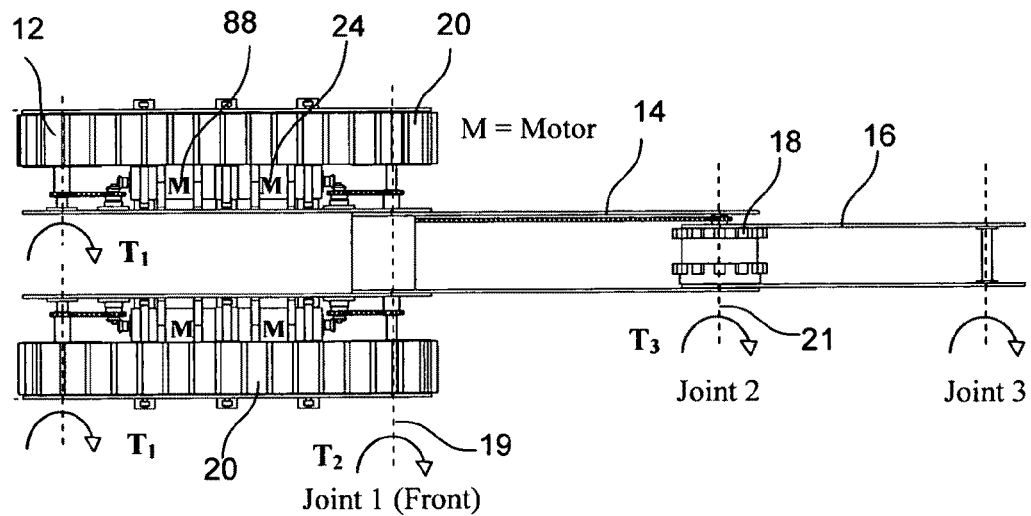
FIG. 8 is a top view of the hybrid mobile robot of the present invention in the open configuration.
Figure 9:
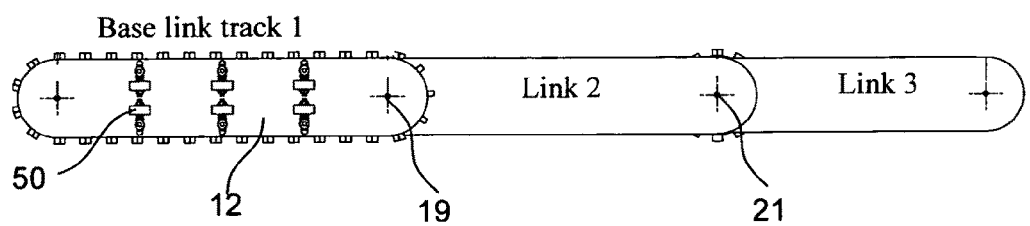
FIG. 9 is a side view of the hybrid mobile robot of the present invention in the open configuration.

Referring to FIG. 8, excluding the end effector, the design includes four motors 24 and 88. Two motors 88 are situated at the back of each of the base link 12 and the other two motors 24 at the front. The motor 88 at the back of each base link 12 provides propulsion to the track 20 attached to that specific base link 12. Both motors 88 at the back together provide the mobile robot 30 translation and orientation in the plane of the platform. The motor 24 at the front of each base link 12 provides propulsion to one additional link. The motor 24 at the front of the right base link propels link 14 and the motor 24 at the front of the left base link 12 propels link 16 (FIGS. 8 and 9). The fact that all link motors are situated at the base provides an important feature to the design since the entire structure's COG is maintained close to the ground.

Base link 1—Tracks

Figure 10:
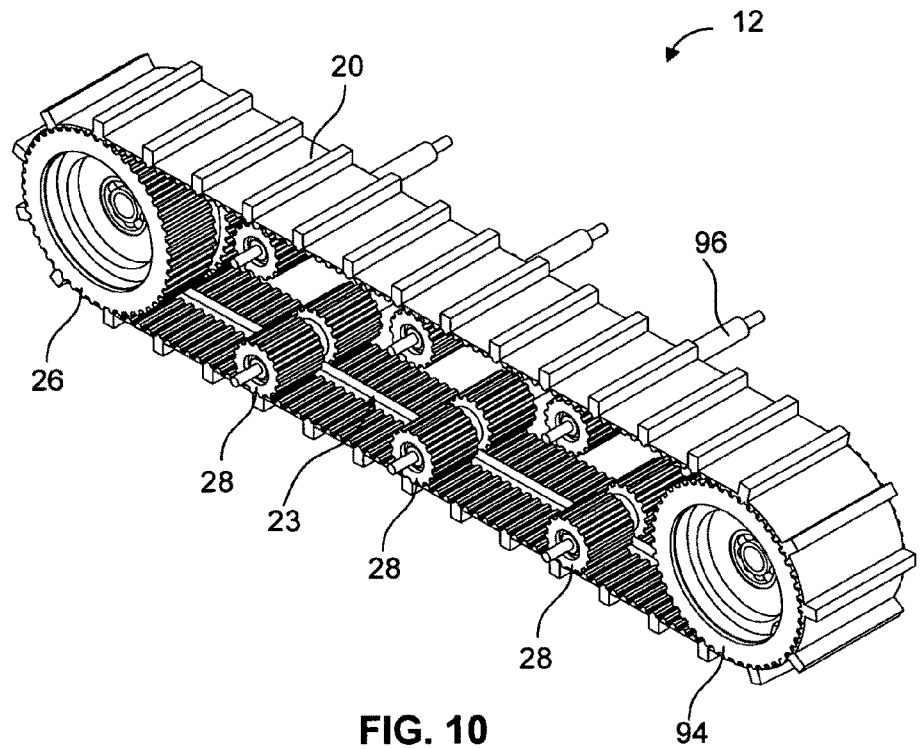
FIG. 10 is a perspective view of the base link track of the hybrid mobile robot of the present invention and showing the pulley arrangement.
Figure 11:
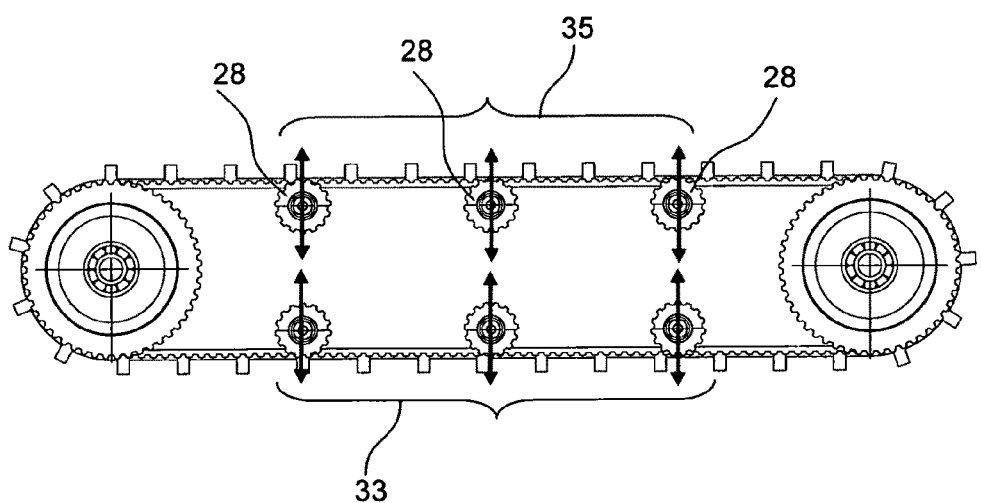
FIG. 11 is a side view of the base link track of the hybrid mobile robot of the present invention showing the general pulley arrangement and the track tension and suspension mechanism.

Referring to FIGS. 10 and 11, the right and left base links 12 are each symmetric in all directions (x, y & z) and preferably identical in terms of the internal driving mechanisms although the mechanisms situated at the front of each base link 12 drives a different link.

Preferably, the width of each track 20 is 100 mm. This is wide enough to enhance support and traction over the ground. The tracks 20 used in this design may be off-the-shelf components. In the center of each track 20, there is a rib 23 that fits into a guide located at the center of the main pulleys 26 and 94 outer rim, as well as on all six planetary supporting pulleys 28 (FIG. 10). This feature prevents the track 20 from sliding off laterally, thus preventing the tracks 20 from coming off the main pulleys 26 and 94 and all six planetary supporting pulleys 28. Rib 23 may be solid as shown herein or serrated.

Built-in Dual-Operation Track Tension and Suspension Mechanism

Figure 12:
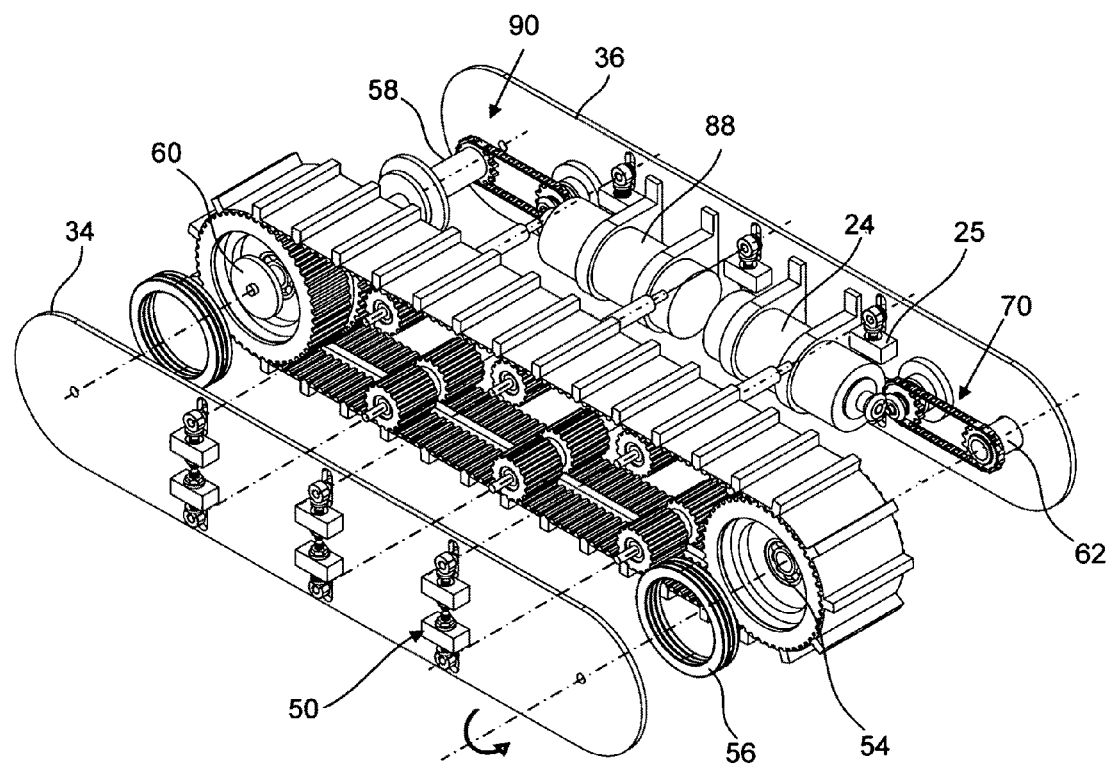
FIG. 12 is an exploded view of the base link track of the hybrid mobile robot of the present invention similar to that shown in FIG. 11.
Figure 13:
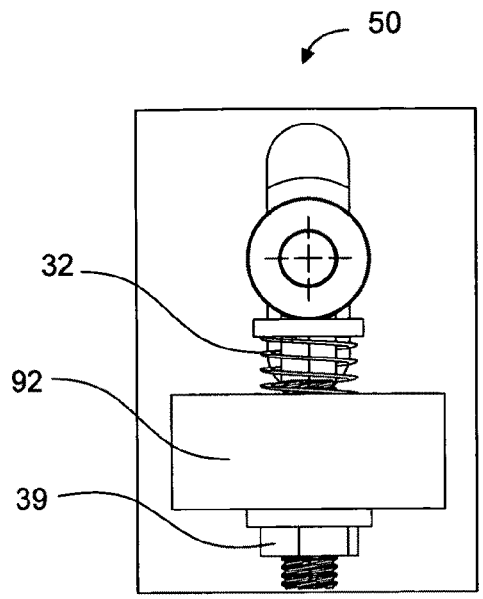
FIG. 13 is an enlarged front view of the spring housing assembly for the base link track of the hybrid mobile robot of the present invention.
Figure 14:
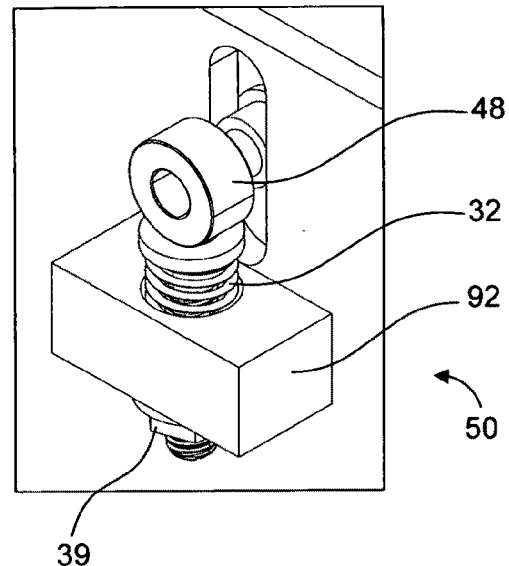
FIG. 14 is an enlarged perspective view of the spring housing shown in FIG. 13.

The tension and suspension mechanism 50 of the supporting planetary pulleys 28 is shown in detail in FIGS. 13 and 14. Each of the supporting pulleys 28 is mounted on a supporting bar 96 (FIG. 10) that is suspended at each end by a compression spring 32 (FIGS. 12-14). The top of each compression spring 32 is supported by a spring guide 48 while the bottom of each spring 32 is seated in a spring housing 92. The ends of each supporting bar 96 are guided through a groove in the right base link wall 34 and left base link wall 36 of the base link 12 as shown in FIG. 12. Therefore, each set of three planetary supporting pulleys 28 in the top and bottom of the left and right base link 12 is suspended by a 2×3 spring 32 array. It will be appreciated by those skilled in the art that the set of three planetary supporting pulleys 28 is by way of example only and that the number of supporting pulleys may be chosen by the user. The purpose of the supporting pulleys 28 is dual and they provide two very important functions. While the bottom three supporting pulleys 28 in each base link 12 are in contact with the ground, they act as a suspension system as shown in FIG. 11 at 33. At the same time, the upper three supporting pulleys 28 will provide a predetermined tension in the track 20 as shown in FIG. 11 at 35. This dual operation track suspension and tension system 50 accounts for the symmetric nature of the design and operation of the mobile robot 30. In other words, if the platform is inverted, the three supporting pulleys 28 that were used as suspension will act to maintain the tension in the tracks 20, while the other three pulleys 28 that were used to provide tension in the tracks 20 will act as a suspension system. The required tension in the track 20 and the suspension stroke can be preset to required values by fastening or loosening the compression nuts 39 (FIGS. 13 and 14). Another usage of the spring 32 array is to absorb energy resulting from falling or flipping, thus providing some compliance to impact forces.

Driving Mechanisms

Each motor 24 and 88 is connected to a front driving gear mechanism 70 and back driving gear mechanism 90, respectively (see FIG. 12). The back driving gear mechanism 90 in the rear of each base link 12 provides propulsion to the track 20 and the front driving gear mechanism 70 in the front of the right and left base link 12 provides propulsion to links 14 and 16, respectively. A magnification of the front driving mechanism 70 is shown in FIG. 15.

Each driving mechanism includes a miter gear 40 attached to the motor 24 and 88 shaft. The corresponding miter gear 98 is attached perpendicularly to the left base link wall 36 through a stationary shaft 42 and sleeve bearing 44. One sprocket 46 is attached to the miter gear 98 while the other sprocket 100 is attached to first joint 19 driving shaft 62 and supported by the front axle 64 via sleeve bearings 66 as shown in FIGS. 16 and 17. Sprocket 100 is driven by sprocket 46 via ANSI chain 102. Depending on whether the driving gear mechanism 90 and 70 propels a pulley 26 and link 14 or 16 respectively, the only part that is different in each driving mechanism is the driving shaft (driving shaft 62 for driving link 14 and driving shafts 68 and 82 for driving link 16).

As shown in FIG. 12, the back pulley 26 is supported by a stationary axle 60 via two radial ball bearings 54 and one thrust bearing 56. The thrust bearing 56 eliminates any direct contact between the back main pulley 26 and the front main pulley 94 and the right base link wall 34 to ensure smooth and frictionless running of each main pulley 26 and 94 and to eliminate any gaps at the same time. Each of the back driving mechanisms 90 is propelling a driving shaft 58 that is connected to the back pulley 26 in a flange connection and is mounted on the back axle 60 in a concentric manner via sleeve bearing.

Figure 15:
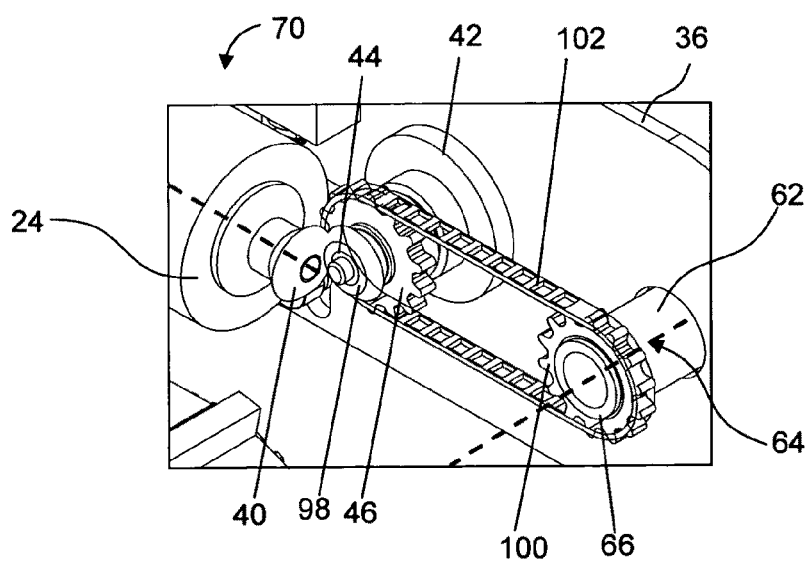
FIG. 15 is an enlarged perspective view of the drive mechanism for the base link track of the hybrid mobile robot of the present invention.
Figures 20, 21:
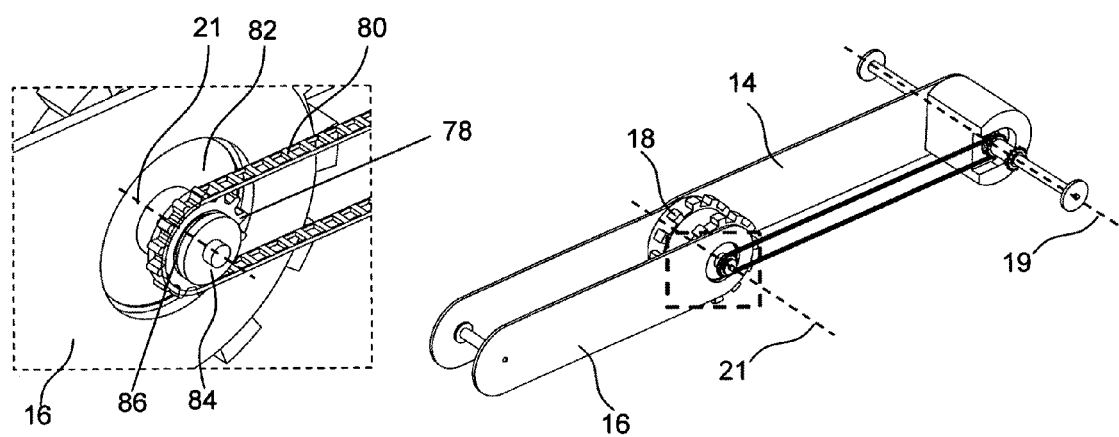
FIG. 20 is a right perspective internal view of the assembly and drive mechanism of the second and third link of the hybrid mobile robot of the present invention.
FIG. 21 is an enlarged right perspective view of the second joint of the drive mechanism shown in FIGS. 18 and 20.
Figure 22:
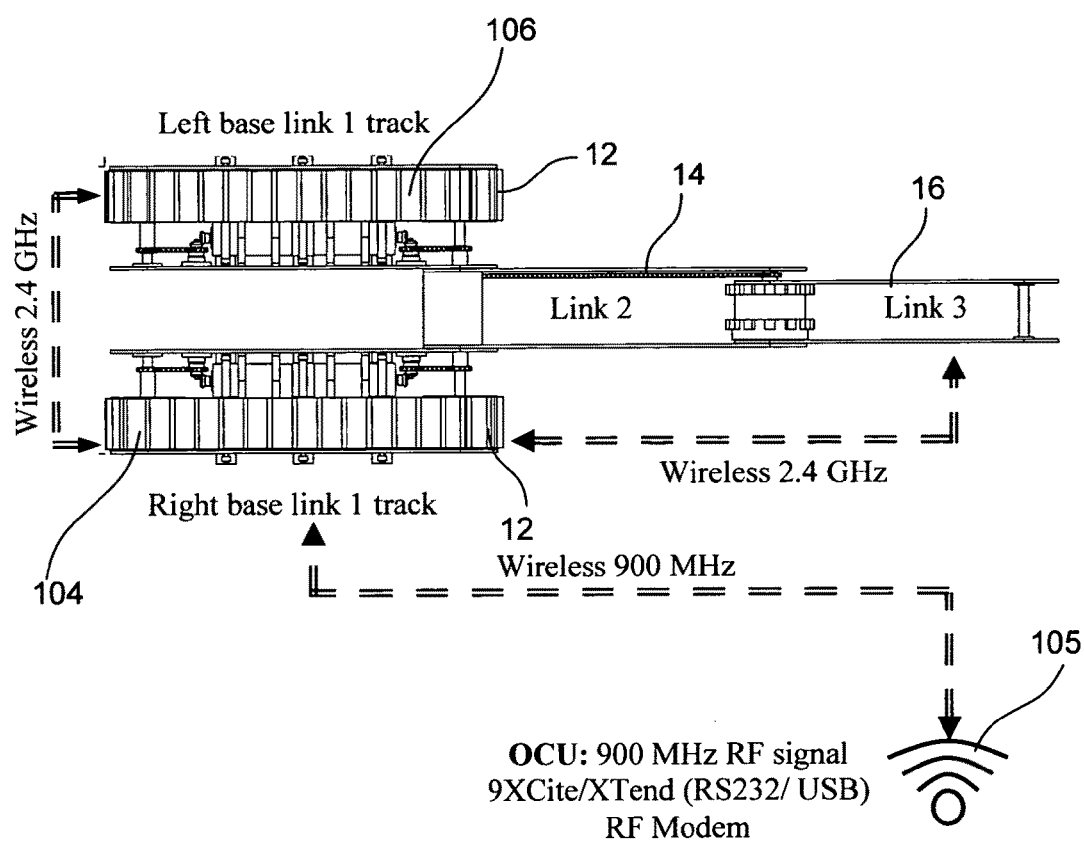
FIG. 22 is a schematic representation of an embodiment of the wireless communication layout for use with the hybrid mobile robot of the present invention.

As shown in FIG. 15, the right front driving mechanism 70 is propelling first joint 19 driving shaft 62, which is connected to link 14 in a flange connection and is mounted on the front axle 64 in a concentric manner via sleeve bearing 66.

As shown in FIGS. 18 to 21, the left front driving mechanism 70 is propelling a stand alone driving shaft 68 (via sprocket 72) that is mounted on the front axle 64 in a concentric manner via sleeve bearings 74. Both ends of stand alone driving shaft 68 are attached to sprockets 72 and 76. Sprocket 76 is driving sprocket 78 through ANSI chain 80. Sprocket 78 is attached to second joint 21 driving shaft 82 that is connected to link 16 in a flange connection and is mounted on link 14 axle 84 in a concentric manner via a sleeve bearing 86.

Communication and Electrical Hardware Architecture

Referring to FIGS. 22-25, preferably the electrical hardware in each of the segments constituting the robot (two base link 12, second link 14 and third link 16) are not connected via wires for data communication distribution purposes. The electrical hardware is situated in three of the robot's segments—namely, two base link 12 and third link 16. The electrical hardware associated with the end-effector or gripper mechanism (best seen in FIGS. 26-32) is situated in third link 16 and is not connected to any of the base link tracks via wires. Each of the segments contains individual power source (rechargeable batteries) and wireless data transceiver modules for inter-segmental wireless communication.

It will be appreciated by those skilled in the art that the wireless system used herein may be any type of wireless system including for example an RF (radio frequency) system or an IR (infrared) system. The specific example shown herein in FIG. 23 is an RF system and is shown by way of example only.

Figure 23:
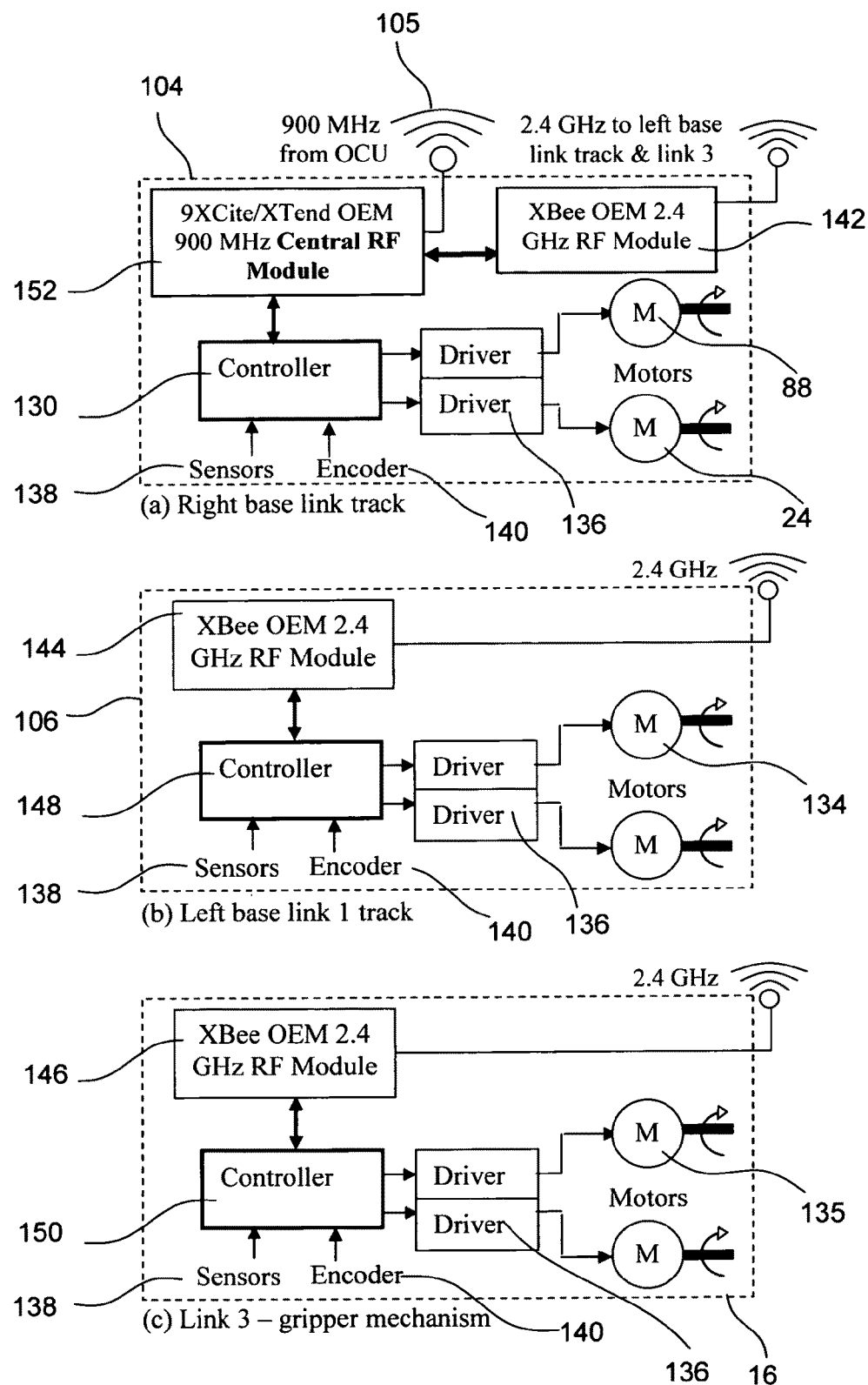
FIG. 23 is a schematic representation of an embodiment of the hardware architecture for use with the hybrid mobile robot of the present invention wherein a) shows the right base link track including a central wireless module; b) shows the left base link track and c) shows the gripper mechanism.

The right base link track 104 contains a central RF module (FIG. 23(*a*)) for communication with a remote OCU (Operator Control Unit) 105, while each of the remaining segments contain RF module for inter-segmental on-board RF communication. This, along with independent power source in each segment, eliminates the need for physical wire, wire loops and slip ring connections between the rotating segments. This enables each of the second link 14 and the third link 16 and the gripper mechanism to provide continuous rotation about their respective joints without the use of slip rings and other mechanical means of connection that may restrict the range of motion of each link.

The central control system or control module can be located anywhere in the mobile robot. It does not have to necessarily be located in the base link. From its location anywhere in the robot, it can communicate with the other links in the robot and the remote OCU 105 in a wireless manner.

By avoiding direct communication between each of the three segments of the robot and the OCU, major problems are minimized. Specifically, there is no need to have a stand-alone vertically sticking out antenna for each of the robot's segments. Sticking out antennas are not desirable due to the robot's structural symmetry, which allows the robot to flip-over when necessary and continue to operate with no need of self-righting. Flat antennas are embedded into the side covers 22 (shown in FIG. 1 and FIG. 31) of the robot for wireless video communication and wireless data communication.

In addition, if each of the base link tracks 104, 106 are receiving data from the OCU directly, loss of data due to physical obstructions (walls, trees, buildings, etc.) between transmitter and receiver may result in inconsistent data acquisition by each base link track that may lead to de-synchronization between the track motions. To overcome this limitation all the data pertaining to all segments of the robot is received in one location in the robot and then transmitted and distributed to the other segments (the segments are separated by fixed distances from one another with no external physical obstructions), then the data received by each of the base link tracks will be virtually identical and any data loss that occurred between the OCU 105 and the robot will be consistent.

Due to the short and fixed distances between the robot's segments/links, the above mentioned problems can be solved by using a low-power on-board wireless communication between the left 106 and right 104 base link tracks and third link 16.

As shown in FIG. 23, preferably the OCU includes MaxStream 9XCite or 9XTend 900 MHz RF Modem. The data transmitted by the stand alone RF modem OCU 105 is received by a 9XCite or 9XTend OEM RF Module 152 (depending on the required range) that is situated in the right base link track 104 as shown in FIG. 23(*a*). The 9XCite module 152 communicates with the right controller 130 that controls the electronics in the right base link track while at the same time sends data pertaining to the other segments (left base link track 106 and third link 16) to a MaxStream XBee OEM 2.4 GHz RF Module 142 in a wire connection. The electronic controls include motors 88, 24 in the right base link track, motors 134 in the left base link track and motors 135 in the link 16 and associated drivers 136, sensors 138, encoders 140 etc. This dada is then transmitted in a wireless manner to two other XBee OEM 2.4 GHz RF Modules 144 and 146 respectively for the left base link track 106 and the other for third link 16 (FIGS. 23(*b*) and (*c*)). Modules 144 and 146 communicate with left controller 148 and third link controller 150, respectively. Left controller 148 and third link controller 150 control the electronics (motors 134 and associated drivers 136, sensors 138, encoders 140 etc.) in the left base link track and gripper mechanism, respectively. The back motor 88 and front motor 24 indicated in FIG. 8 are shown in FIG. 23(*a*). Motor 24 in the front of the right base link track 104 drives link 14 and motor 24 in the front of the left base link track 106 drives link 16. The controller 130 in base link 104 controls each driver connected to each motor 24 and 88. Similarly, the controller 148 in base link 106 controls each driver connected to each motor 134 which drive base link 12. The controller inside link 16 (FIG. 23(*c*)) controls the drivers that drive the motors related to the gripper mechanism 122.

The major advantages of the XBee OEM RF modules 142, 144 and 146 are: (i) it is available with a PCB chip antenna (FIG. 25), which eliminates the need for a vertically sticking out antenna for each link segment of the robotic platform; (ii) its operating frequency is 2.4 GHz—namely, different operating frequency than the primary 9Xtend/9Xcite RF module; (iii) fast RF data rate of 250 kbps; and (iv) its small form factor (2.5 times 3 cm) saved valuable board space in the compact design of the robot.

The chip antenna is suited for any application, but is especially useful in embedded applications. Since the radios do not have any issue radiating through plastic cases or housings, the antennas can be completely enclosed in our application. The XBee RF module with a chip antenna has an indoor wireless link performance of up to 24 m range. In the case of the hybrid robot design, the maximum fixed distance between the base link tracks and link 3 is less than 0.5 m.

This concept provides a simple and inexpensive solution when onboard inter-segmental wireless communication is required to avoid any wire and slip-ring mechanical connections between different parts of a given mechanical system.

Figure 24:
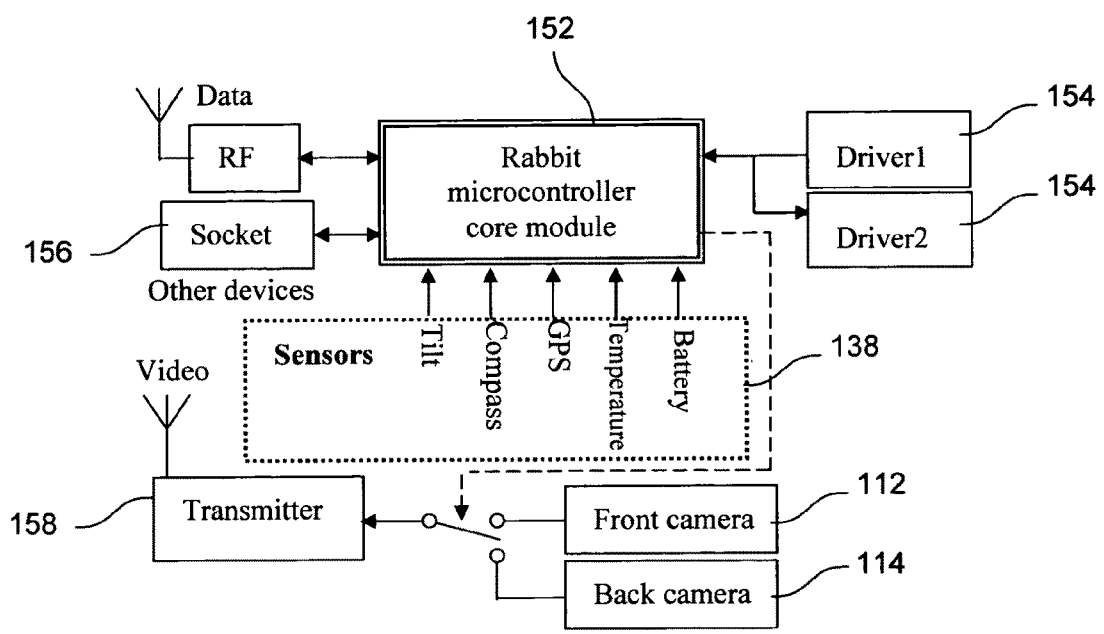
FIG. 24 is a schematic layout of the sensors and cameras for the hybrid mobile robot shown in FIG. 23.
Figure 25:
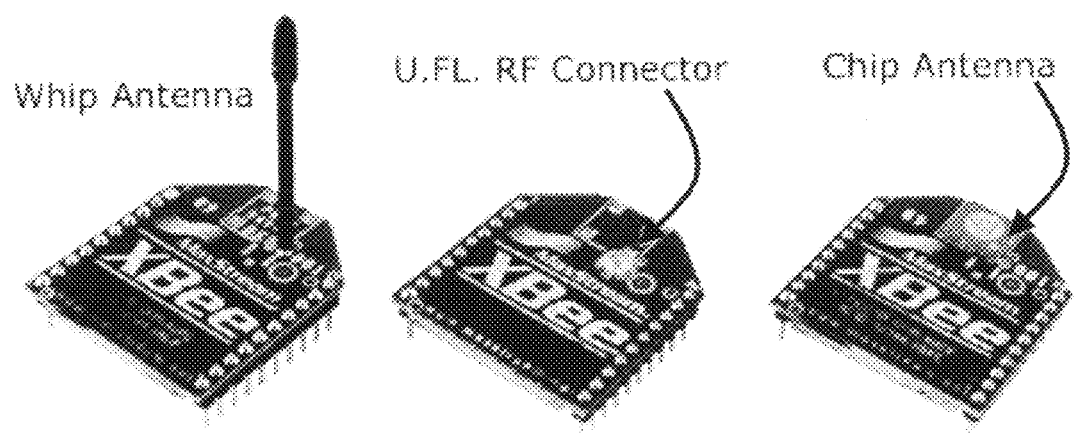
FIG. 25 shows three possible wireless modules used with the hybrid mobile robot of the present invention.
Figure 31:
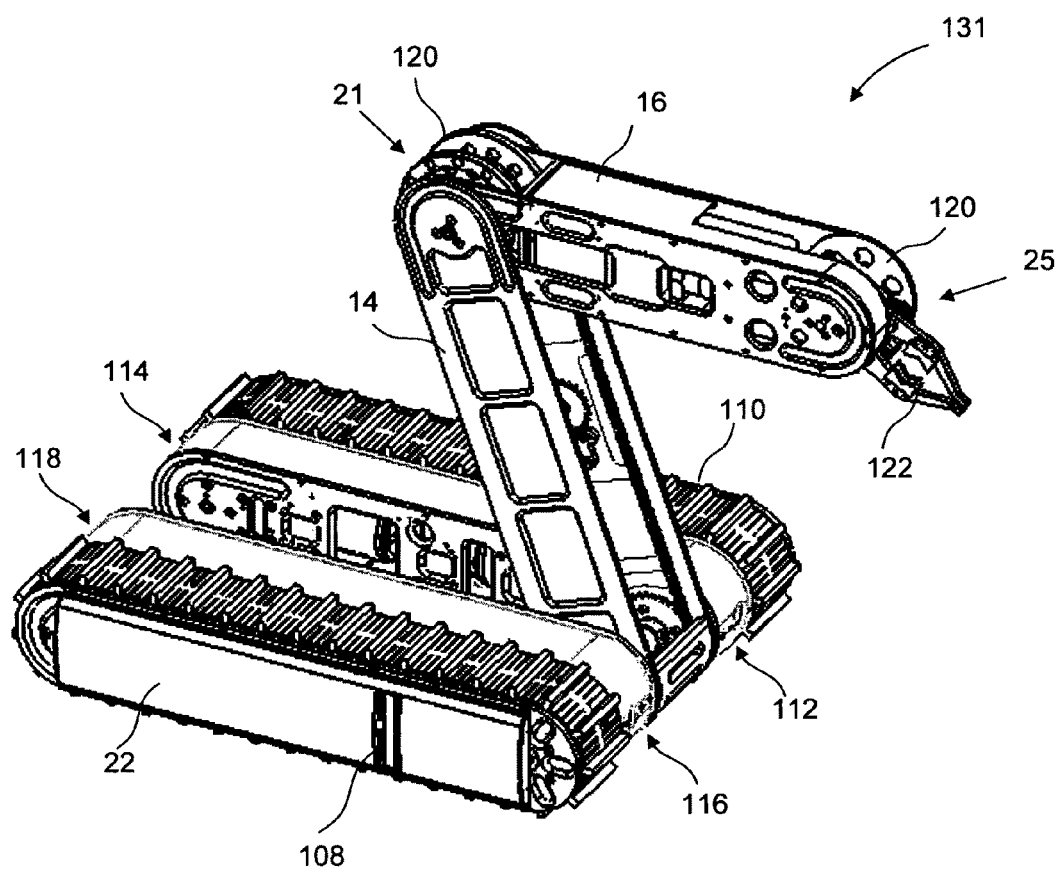
FIG. 31 is a perspective view of a hybrid robot of the present invention showing cameras and other accessories, an end effecter, and passive wheels on the third joint.

Referring to FIG. 24, preferably the controller 130 in each link is a Rabbit based core module 152. There are several analog input channels on the module through which the microcontroller receives signals from the sensors. Each motor in the base link tracks is driven by a motor driver 154, which acts as a motor controller to provide position and speed control. Signals from encoders attached to the rear shaft of each motor are sent to the drivers as feedback. A socket 156 to the microcontroller is reserved for other signals, which may be added in the future. As shown in FIGS. 24 and 31, there are two cameras 112, 114 located in the front and back of the left base link track, which provide visual information to the OCU operator on the robot's surroundings. A video transmitter 158 is used to transmit the video signals to the OCU 105. A switch controlled by the microcontroller 152. Note, this microcontroller 152 is stand alone, and can be connected to any of the controllers that exist in the left or right track. decides the image of which camera is being transmitted. In addition audio signals may also be transmitted to the OCU 105.

Power is generally one of the constraining factors for small robot design. In order to generate the required torques for each link including the gripper mechanism, preferably rechargeable Lithium-Ion battery units in a special construction with the inclusion of Protection Circuit Modules (PCMs) are used in order to safely generate high current discharge based on the motors demands. With the combination of this power source along with a proper selection of brushless DC motors and harmonic gear-head drives, high torques can be generated. Each of the left 106 and right 104 base link tracks and the gripper mechanism situated in the space provided in third link 16 has a standalone power source.

It will be appreciated by those skilled in the art that the embodiments shown herein are by way of example and a number of variations or modification could be made to the embodiment whilst staying within the invention. For example, each miter gear 40 and 98 could be replaced with a bevel gear to allow any ratio greater than 1:1 to generate any desired torque to drive link 14 or link 16. For the same purpose, various diameter combinations for sprocket gears 46 and 100 can be selected to provide any desired torque value to drive pulley 26 and links 14 or 16. The front driving mechanism 70 and the back driving mechanism 90 can be reconfigured with different gear constructions and ratios to generate torque for driving the pulley 26 and links 14 or 16. For instance, the back driving mechanism can be changed such that the miter gear 40 and 98 and the sprocket gears 46 and 100 can be replaced altogether with one bevel gear set such that the driving bevel gear is attached to the motor 88 output shaft and the driven bevel gear is attached directly on the pulley 26. The motors 24 and 88 also can be reoriented differently inside the base links 12 to allow different gear constructions of driving mechanisms 70 and 90. Additional gear head types such as harmonic drives and planetary gears can be placed between driving mechanisms 70 and 90 and motors 24 and 88 respectively to generate any desired torque to drive link 14 or link 16. As well, the thrust bearing 56 is optional in the design. Further it will be appreciated that the robot may include more than three links. Rather the robot may include multiple links forming a snake-like robot.

Figure 26:
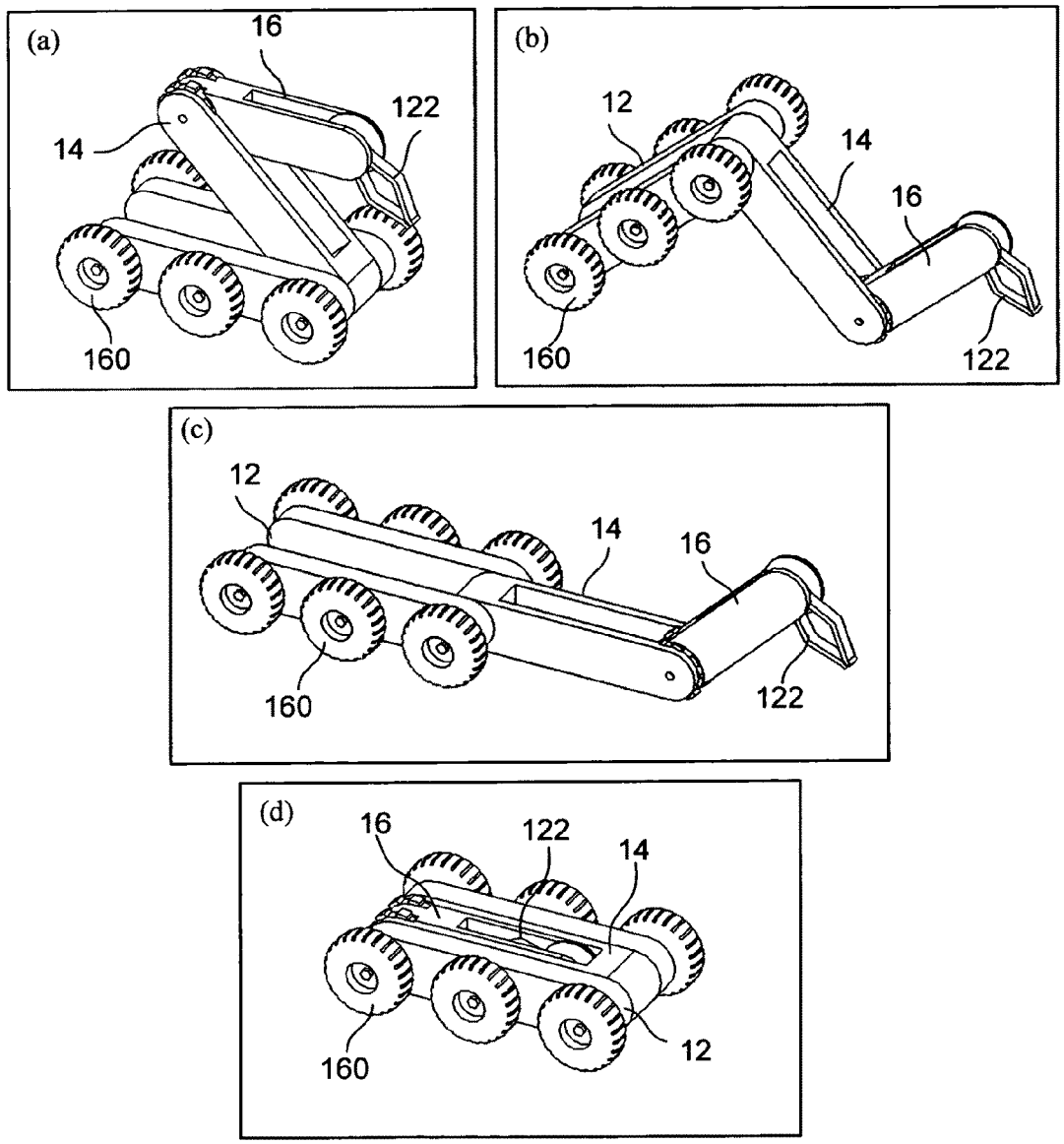
FIG. 26 shows four perspective schematic views of an alternate embodiment of the hybrid mobile robot of the present invention having a wheel drive system wherein a) shows a partially open configuration b) shows the second link configured as a platform for enhanced maneuverability and the third link for manipulation; c) shows the second link configured as a platform for enhanced traction and the third link for manipulation and d) shows the closed or stowed configuration.

Referring to FIG. 26, the hybrid mobile robot of the present invention may have wheels 160, rather than tracks 20. Wheels 160 are attached to base links 12. Base links 12, second link 14 and third link 16 are as described above. An end effector 122 is pivotally connected to third link 16. In the stowed or closed configuration shown in FIG. 26(*d*) end effector is nested in link 16 such that no part of end effector 122 is above or below link 16. Similarly link 16 is nested in link 14 and link 14 is nested between base links 12.

Figure 27:
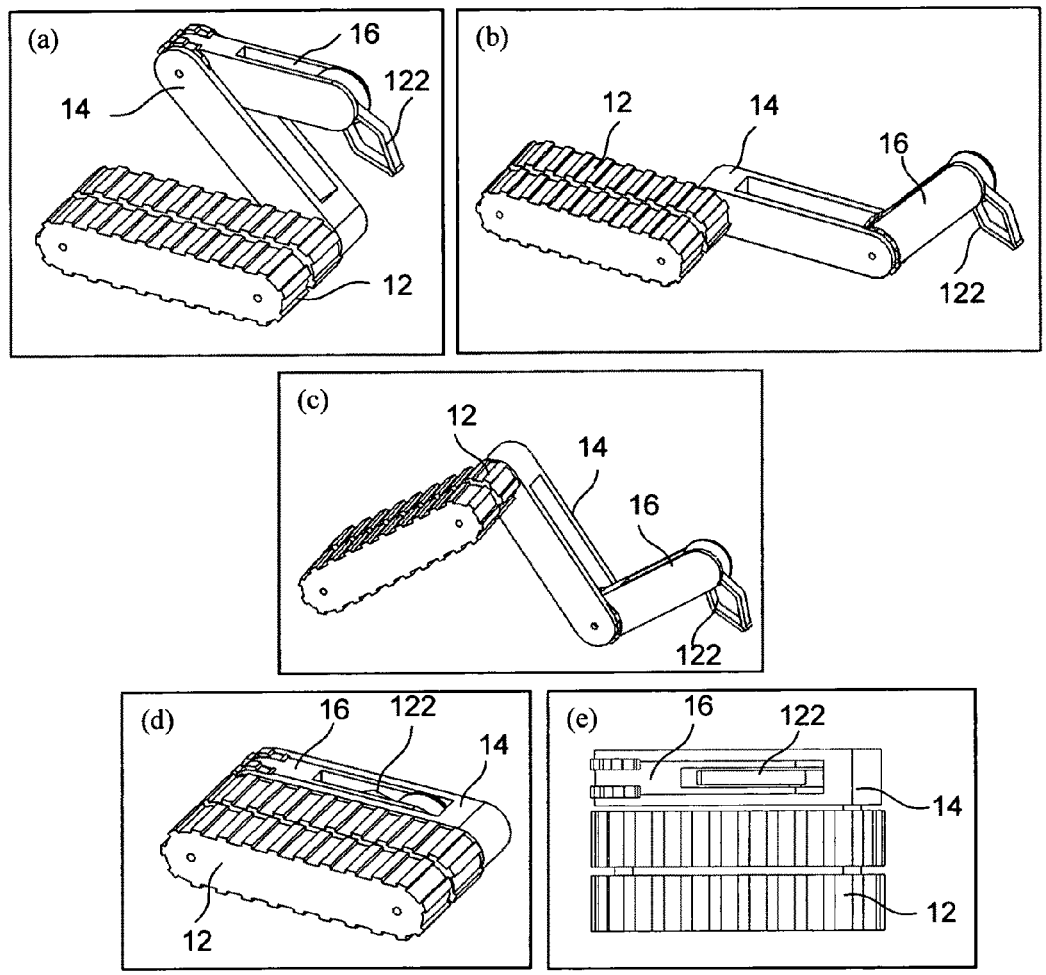
FIG. 27 shows four perspective schematic views and a top view of an alternate embodiment of the hybrid mobile robot of the present invention having a right and left base link position adjacent to each other with a second link on one side thereof and a third link nested in the second link, wherein a), b) and c) show the open configurations, d) shows the closed or stowed configuration, and (e) shows the top view of the closed or stowed configuration.
Figure 28:
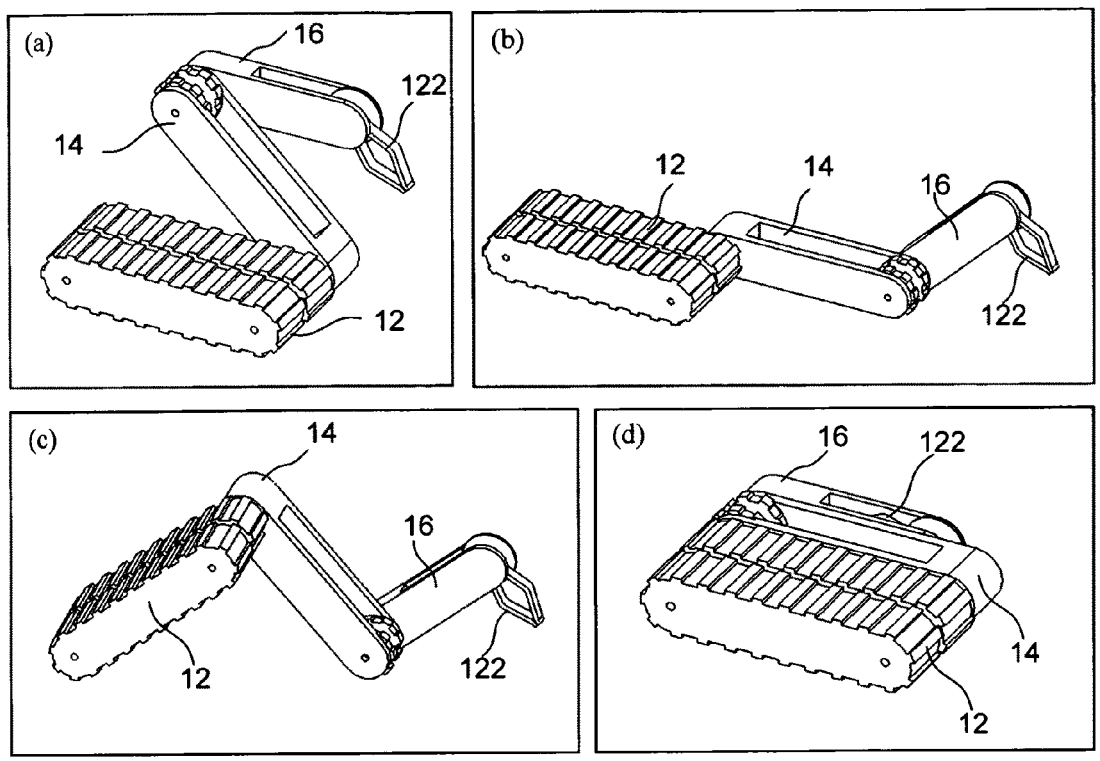
FIG. 28 shows four perspective schematic views of a further alternate hybrid mobile robot of the present invention similar to that shown in FIG. 27 except that the third link is adjacent to the second link on the opposed side of the second link, wherein a), b) and c) show the open configurations, and d) shows the closed or stowed configuration.
Figure 29:
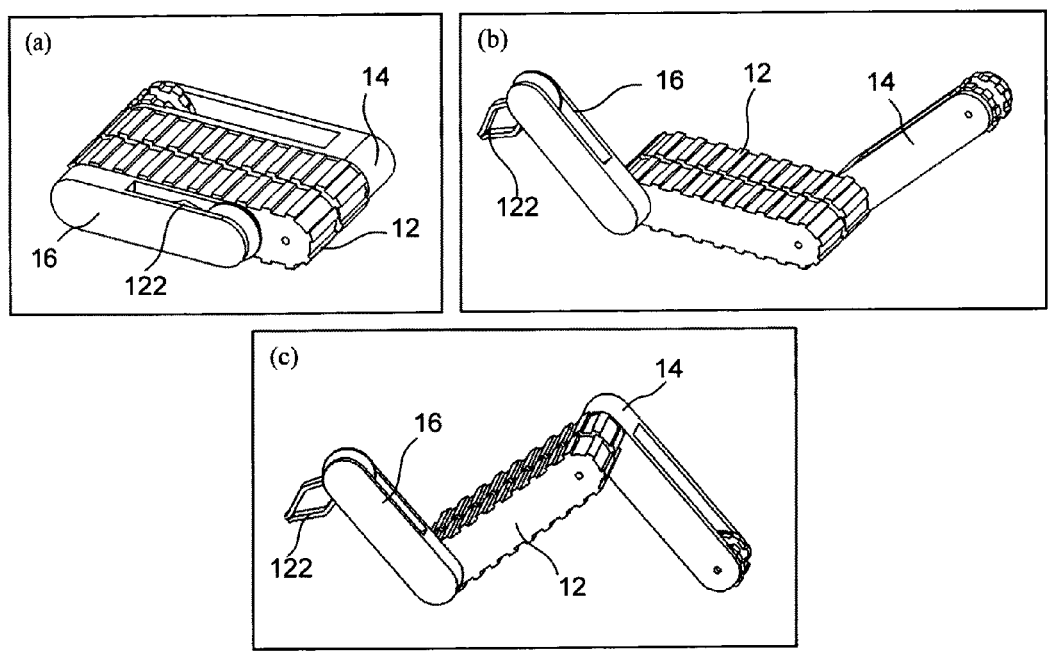
FIG. 29 shows three perspective schematic views of a further alternate hybrid mobile robot of the present invention similar to those shown in FIGS. 27 and 28 but having the second link on one side of the right and left base links and the third link on the other side of the right and left base links, wherein (a) shows the closed or stowed position and b) and c) show the open configurations.

Referring to FIGS. 27 to 29, the positioning of the base links 12, the second link 14 and third link 16 may vary depending on the particular configuration. For example right and left base links 12 of the hybrid mobile robot of the present invention can be aligned proximate to each other, and joined at the front and the back, rather than spaced apart from each other. It will be appreciated by those skilled in the art that rather the two base links shown herein could be combined as a single base link. In these alternative embodiments, the second link 14 may fold by the side of the base links 12 and the third link 16 nests inside the second link 14 as shown in FIG. 27. Alternatively the third link 16 may fold by the side of the second link 14 as shown in FIG. 28. In a further alternative the second link 14 may be attached to one of the right and left base links 12, while the third link 16 is attached to the other of base links as shown in FIG. 29.

The embodiment shown in FIG. 29 also provides an additional or alternative location for an end effector. For example, since the third link 16 is attached to one of the base links 12, rather than to or inside the second link 14, a space is available for the second link 14 to have an additional end effector at its end (not shown). Furthermore, an additional link 16 with an end effector 122 can be attached to one of the base links. In one possible embodiment, one link 16 with end effector 122 can be attached to one end of one of the base links 12, while an additional link 16 with end effector 122 is nested inside link 14 that is attached to the other end of the other base link, which will increase the available locations for end effectors (not shown).

Figure 30:
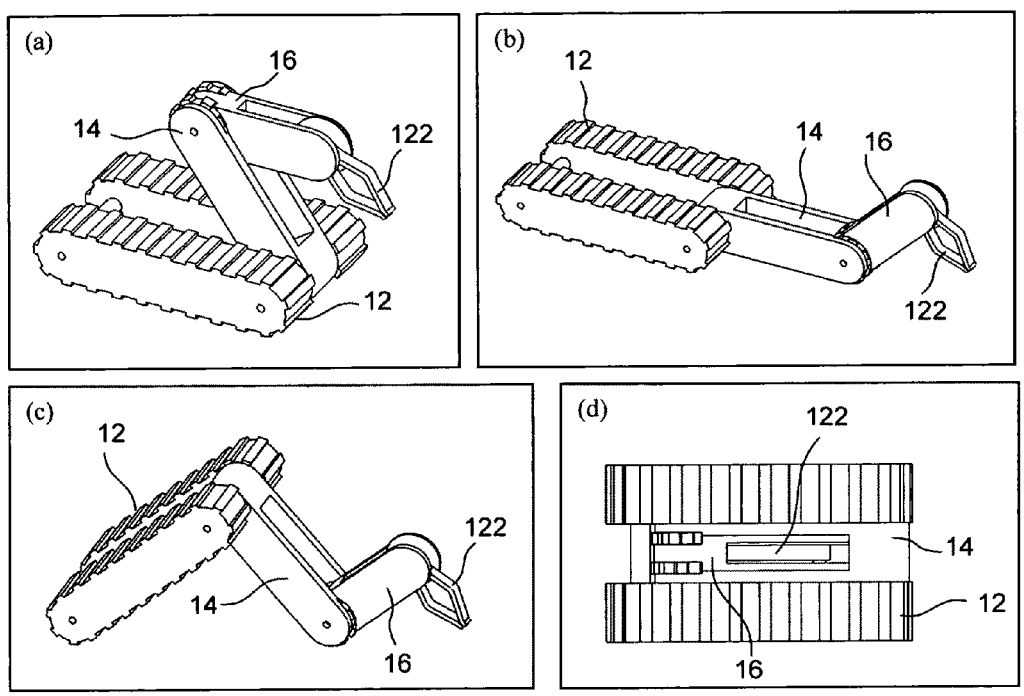
FIG. 30 shows three perspective schematic views and a top view of another alternate embodiment of the hybrid mobile robot of the present invention similar to that shown in FIG. 4, but having the left and right base links joined at each end thereof wherein a) b) and c) show open configurations and (d) is the top view of the closed configuration.

Referring to FIG. 30, the hybrid mobile robot of the present invention may be configured wherein the pair or first and second base links 12 are attached at the front and back and the second link is shorter than the base links and consequently the third link is shorter and in the previous embodiments.

Passive wheels 120 can be added on third joint 25 (shown in FIG. 31) between the gripper mechanism that occupies the space in link 16 and link 16. The passive wheels are used to enhance the mobility capability of the platform when link 16 is used to support the entire platform for various mobility requirements. Referring to FIG. 31, a fully loaded robot is shown at 131. The fully loaded robot 130 includes an end effector 122 and different type of accessories that are usually imbedded in a mobile robot. Robot 130 has embedded flat data wireless antenna 108, embedded flat video wireless antenna 110, front and back CCD cameras 112, 114, front and back LED lights 116, 118. One antenna is used to transmit and receive traction and manipulation signals to the central control system and a second antenna is used to transmit and receive audio and video signals.

In another aspect of the present invention, the different links can be attached and detached to arrive at any of the various configurations according to the desired application.

It will be appreciate by those skilled in the art that in all of the embodiments shown herein the robot may flip over or be inverted. In order to facilitate this, the robot has a stowed position. The base links 12 define an upper plane and a lower plane, similarly the second link 14 defines a second link upper plane and lower plane; the third link 16 defines a third link upper plane and lower plane; and the end effector 122 defines an end effector upper and lower plane. In the stowed position the second link upper and lower plane, the third link upper and lower plane and the end effector upper and lower plane are all within the upper and lower plane of the base links. The embodiments shown in FIGS. 1 to 9, 26, 30 and 31 have a stowed position wherein the second link 14 is nested between spaced apart first and second base links 12, the third link 16 is nested in the second link 14.

It will be appreciated by those skilled in the art that the embodiments of the present invention provide solutions to a series of major issues related to the design and operation of mobile robots operating on rough terrain. Specifically the embodiments of the invention shown herein have major two advantages. The embodiments of the invention provide a novel approach for a mobile robot where the mobile platform and the manipulator arm are one entity rather than two separate and attached modules. In other words, the mobile platform is used as a manipulator arm and vice versa. This way, the same joints (motors) that provide the manipulator's dof's, also provide the mobile platform's dof's. As well the embodiments of the invention herein enhance the robot's mobility by "allowing" it to flip-over and continue to operate instead of trying to prevent the robot from flipping-over or attempting to return it (self-righteousness). When a flip-over takes place, the user only needs to command the robot to continue to its destination from the current position.

Each item of the idea has its own advantages, and each one is an idea by itself. Furthermore, the two parts of the idea complement each other. In the embodiments of the present invention described herein, the mobile platform is part of the manipulator arm, and the arm is also part of the platform. As fewer components are required (approximately 50% reduction in the number of motors), the embodiments herein result in a much simpler and robust design, significant weight reduction and lower production cost. Another feature of the embodiments herein is that the arm and platform are designed as one entity, and the arm is part of the platform. This eliminates the exposure of the arm to the surroundings while the robot is heading to a target perhaps in close and narrow surroundings (e.g. an underground tunnel). As soon as the target is reached, the arm is deployed in order to execute desired tasks. Since the arm is part of the platform, it is not exposed to the surroundings, and the mobility is enhanced. In the embodiments herein the platform is symmetric and is therefore able to continue to the target from any orientation with no need of self-righting when it falls or flips over. This enhances considerably the ability of the robot to adapt to the terrain according to the needed degree of maneuverability and traction. Further when the robot encounters an obstacle or a steep inclination in the terrain it is sometimes inevitable and hence preferable to let the robot fall and roll, and continue its mission without self-righting in order to reach the target sooner.

A major advantage of the new design paradigm is that it is scalable. It can be applied to small backpack-able as well as large track-transported EOD (Explosive Ordnance Disposal) mobile robots.

Generally speaking, the systems described herein are directed to hybrid mobile robots. As required, embodiments of the present invention are disclosed herein. However, the disclosed embodiments are merely exemplary, and it should be understood that the invention may be embodied in many various and alternative forms. The figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to hybrid mobile robots.

As used herein, the term "about", when used in conjunction with ranges of dimensions, temperatures or other physical properties or characteristics is meant to cover slight variations that may exist in the upper and lower limits of the ranges of dimensions so as to not exclude embodiments where on average most of the dimensions are satisfied but where statistically dimensions may exist outside this region.

As used herein, the terms, "comprises" and "comprising" are to construed as being inclusive and opened rather than exclusive. Specifically, when used in this specification including the claims, the terms "comprises" and "comprising" and variations thereof mean that the specified features, steps or components are included. The terms are not to be interpreted to exclude the presence of other features, steps or components.

What is claimed as the invention is:

1. A hybrid mobile robot having a plurality of links comprising:
   a first link, the first link being adapted to function as at least one of a locomotion device, a manipulation device and an interconnecting link;
   at least a second link attached to the first link via at least one joint and being adapted to function as at least one of a locomotion device, a manipulation device and an interconnecting link; and
   at least one of the said links being adapted to function as a manipulation device for external objects in addition to being adapted to function as a locomotion device or interconnecting link;
   wherein the links are capable of being stowed or positioned relative to the other links in a configuration enabling at least one of locomotion and manipulation.

2. A hybrid mobile robot as claimed in claim 1 further comprising a at least one links attached via at least one joint to each other wherein the links are capable of being stowed or positioned relative to the other links in a configuration enabling at least one of locomotion, manipulation and interconnection and attached to at least one of the first link and the second link via at least one joint.

3. A hybrid mobile robot as claimed in claim 2 wherein at least one of the plurality of links is adapted to function as an end effector attached to one of the plurality of links via at least one joint wherein the end effector is capable of being stowed or positioned relative to the other links in a configuration enabling at least one of locomotion and manipulation.

4. A hybrid mobile robot as claimed in claim 3 wherein the links can attach and detach to arrive at a configuration according to the desired application.

5. A hybrid mobile robot as claimed in claim 2 wherein at least one of the said joints is adapted to function as at least one of locomotion and manipulation.

6. A hybrid mobile robot as claimed in claim 2 wherein at least one of the plurality of links exchanges at least one of sensor data and control data wirelessly inter-link and/or intra link to enable at least one of manipulation and locomotion.

7. A hybrid mobile robot as claimed in claim 6 further comprising a plurality of external operator control units.

8. A hybrid mobile robot as claimed in claim 2 wherein the links can attach and detach to arrive at a configuration according to the desired application.

9. A hybrid mobile robot as claimed in claim 1 wherein the links can attach and detach to arrive at a configuration according to the desired application.

10. A method of operating a hybrid mobile robot which comprises:
    a) Locomoting the position of the hybrid mobile robot using at least one of base link, second link, end link, end effector, and a combination of links for traction while the other links are positioned for maneuverability or for support;
    b) Manipulating an external object using at least one of base link, second link, end link, end effector, and a combination of links while the other links are used to maintain stability, wherein at least one of said base link, second link, end link or end effector are capable of locomotion in addition to manipulating an external object;
    c) Combining the locomotion and manipulation of steps a and b concurrently or in succession in various combinations to achieve at least one of locomotion of position, manipulation, and both locomotion and manipulation.

11. A method of operating the hybrid mobile robot as claimed in claim 10 wherein the locomoting of position is augmented by using at least one of passive wheels, and active wheels, to provide stability and support for links when used for locomotion.

12. A method of operating the hybrid mobile robot as claimed in claim 10 wherein the manipulating of the external object is augmented by using at least one of passive wheels, and active wheels, to provide stability and support for links when used for manipulation.

* * * * *